United States Patent
Lu

(10) Patent No.: US 8,274,915 B2
(45) Date of Patent: Sep. 25, 2012

(54) METHODS AND APPARATUS FOR OPERATING A WIRELESS COMMUNICATIONS SYSTEM

(75) Inventor: Yanling Lu, Beijing (CN)

(73) Assignee: Fujitsu Limited, Kawasaki (JP)

( * ) Notice: Subject to any disclaimer, the term of this patent is extended or adjusted under 35 U.S.C. 154(b) by 645 days.

(21) Appl. No.: 12/543,696

(22) Filed: Aug. 19, 2009

(65) Prior Publication Data
US 2010/0046458 A1 Feb. 25, 2010

(30) Foreign Application Priority Data

Aug. 22, 2008 (EP) .................................. 08162821

(51) Int. Cl.
*H04W 72/02* (2009.01)
*H04W 24/02* (2009.01)
*H04W 24/04* (2009.01)

(52) U.S. Cl. ........ 370/254; 370/312; 370/341; 370/345; 455/450; 455/510; 455/517

(58) Field of Classification Search .................. 370/254, 370/255, 312, 329, 341, 345, 350; 455/422.1, 455/450, 453, 507, 509, 510
See application file for complete search history.

(56) References Cited

U.S. PATENT DOCUMENTS

| | | | | |
|---|---|---|---|---|
| 7,620,020 B2 * | 11/2009 | Lim et al. | ....................... | 370/335 |
| 8,059,605 B2 * | 11/2011 | Yeou et al. | ..................... | 370/332 |
| 2008/0159427 A1 * | 7/2008 | Kang et al. | ..................... | 375/260 |
| 2009/0274041 A1 * | 11/2009 | Chou et al. | ..................... | 370/216 |

FOREIGN PATENT DOCUMENTS

| | | |
|---|---|---|
| EP | 1 742 501 | 1/2007 |
| EP | 1 915 007 | 4/2008 |
| WO | 00/21320 | 4/2000 |
| WO | 2008/054112 | 5/2008 |

OTHER PUBLICATIONS

Extended European Search Report with Abstract and Written Opinion attached for corresponding European Patent Application No. 10 18 6857, dated Aug. 19, 2011.

(Continued)

*Primary Examiner* — Chi Pham
*Assistant Examiner* — Ahmed Elallam
(74) *Attorney, Agent, or Firm* — Myers Wolin, LLC

(57) ABSTRACT

A wireless communications system comprising at least one network station and a plurality of subscriber stations. As part of a network access procedure, a number of the subscriber stations selecting a time slot from a plurality of predefined time slots and transmitting an individual code to the network station in the selected time slot. At the network station, receiving and decoding the codes and broadcasting a preliminary decoding status report to the subscriber stations and broadcasting a detailed decoding status report associated with each time slot in which one or more codes were decoded successfully. At a subscriber station which transmitted a code, identifying successful decoding if the preliminary decoding status indicator associated with the time slot in which subscriber station transmitted its code comprises a positive indicator, and if the detailed decoding status report associated with that positive indicator identifies the code transmitted by the subscriber station.

12 Claims, 16 Drawing Sheets

OTHER PUBLICATIONS

Nader Mahravari; "Random-Access Communication with Multiple Reception"; 8097 IEEE Transactions on Information Theory 36 May 1990, No. 3., New York US; XP 000132605; pp. 614-622 [Ref.: EESR dated Aug. 19, 2011].

IEEE Std. 802.16TM-2004 (Revision of IEEE Std. 802. 16-2001); IEEE Standard for Local and metropolitan area networks; Part 16: Air Interface for Fixed Broadband Wireless Access Systems; IEEE Computer Society and the IEEE Microwave Theory and Techniques Society; Sponsored by the LAN/MAN Standards Committee; IEEE, 3 Park Avenue, New York, NY 10016-5997, USA; Dated Oct. 1, 2004 [Ref.: EESR dated Aug. 19, 2011].

European Search Report and Annex to the European Search Report on priority European Patent Application No. 08162821.6, dated Feb. 23, 2009.

IEEE Computer Society and IEEE Microwave Theory and Techniques Society; IEEE Std 802.16-2004 (Revision of IEEE Std 802. 16/2001); IEEE Standard for Local and metropolitan area networks; "Part 16: Air Interface for Fixed Broadband Wireless Access Systems"; dated Oct. 1, 2004; [Ref.: European Search Report dated Feb. 23, 2009].

IEEE Computer Society and IEEE Microwave Theory and Techniques Society; IEEE Std 802.16-2005 and IEEE Std 802.16-2004/Cor1-2005 (Amendment and Corrigendum to IEEE Std 802.16-2004); IEEE Standard for Local and metropolitan area networks; "Part 16: Air Interface for Fixed and Mobile Broadband Wireless Access Systems"; Amendment 2: Physical and Medium Access Control Layers for Combined Fixed and Mobile Operation in Licensed Bands and Corrigendum 1; dated Feb. 28, 2006; [Ref.: European Search Report dated Feb. 23, 2009].

LAN MAN Standards Committee, IEEE Computer Society and IEEE Microwave Theory and Techniques Society; Prepared by: Relay Task Group of IEEE 802.16; Draft Amendment to IEEE Standard for Local and Metropolitan Area Networks; IEEE P802.16j/D3; "Part 16: Air Interface for Fixed and Mobile Broadband Wireless Access Systems" Multihop Relay Specification; dated Feb. 29, 2008; [Ref.: European Search Report dated Feb. 23, 2009].

* cited by examiner

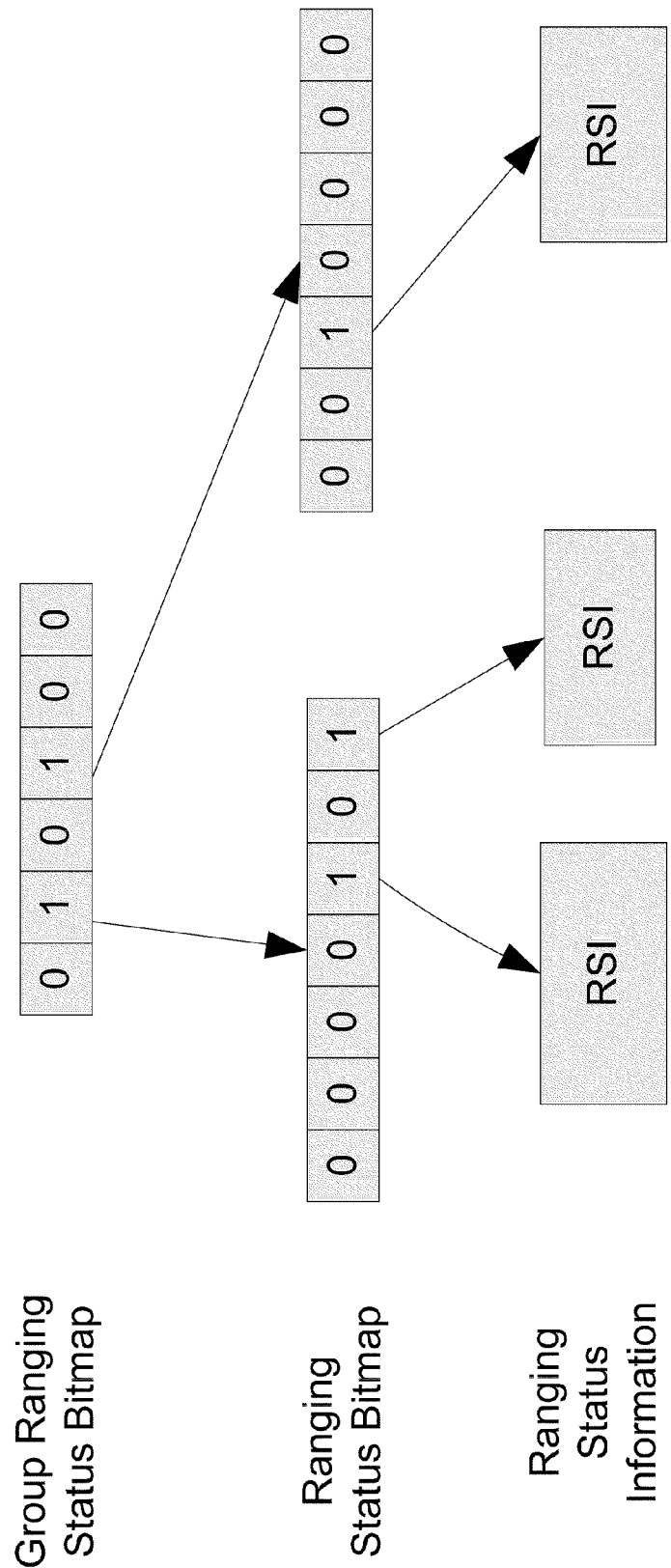

METHODS AND APPARATUS FOR OPERATING A WIRELESS COMMUNICATIONS SYSTEM

This application claims priority to European Patent Application No. 08162821.6 filed on Aug. 22, 2008, the disclosure of which is expressly incorporated herein by reference in its entirety.

Ranging is an important process in the mobile WiMAX standard. Power adjustment, timing offset estimation, and synchronization between a base station (BS) and a subscriber station (SS) within a cell are done using ranging procedures.

In a ranging procedure, a ranging code is transmitted from a subscriber station to a base station, to obtain information on the network setup and to synchronize the link. In particular, the ranging procedure can obtain the following types of information:
  SS presence—either for network entry, handover, or bandwidth contention;
  SS timing offset;
  SS frequency offset (optional)—carrier frequency offset (CFO) can also be determined in previous stages of connection setup, using the preamble codes transmitted from the BS to the SS.
The SS perform the following different types of ranging procedure:
  Initial ranging on network entry to indicate the presence of the SS and synchronize timing;
  Bandwidth contention to request access to the shared spectrum resource;
  Periodic ranging to update and track variations in timing offset and CFO;
  Handover when supporting mobility and performing handoff from one BS to another.

The fundamental mechanism of ranging involves the SS transmitting a randomly-selected code division multiple access (CDMA) code in a specified ranging channel, on a randomly-selected ranging slot. The BS receives this code and determines the required information. One ranging channel uses a number of subcarriers (for example, 144); other subcarriers are allocated to other ranging channels or user data. A number of codes are allocated to each ranging mode (initial, handover, periodic, bandwidth contention).

According to the IEEE 802.16-2004, IEEE 802.16e-2005 and IEEE 802.16j standards (hereinafter referred to as "16d", "16e" and "16j" respectively), a base station (BS) may decode multiple ranging codes in ranging opportunities/ranging channels, and it takes some time to handle the corresponding procedures. It is not time-efficient for a mobile station (MS) to simply wait for a contention resolution time interval, without knowing contention results in advance.

A ranging collision may occur in one of the following scenarios:—
  Scenario 1: The low signal-to-noise ratio (SNR) caused by noise spreading or frequency-selective fading in the multicarrier environments leads to undecodable ranging codes, which usually happens when too many ranging codes are conveyed in a single ranging slot, as illustrated in FIG. 1.

As shown in FIG. 1, when a 16e MS sends a ranging code for initial ranging, it starts a T3 timer to wait for the response from the BS. If the timer expires, the MS performs a backoff algorithm to calculate the next ranging instance. The overall delay caused by ranging collisions can be calculated by:

$$\text{Delay} = (T3 + \text{backoff\_time}) * R \quad (1)$$

where T3 is the timer value (ranging from 60 ms to 200 ms) and R is the number of retries. As for bandwidth request ranging, equation (1) is still applied and the T3 timer is replaced by a contention-based reservation timeout.

Scenario 2: The BS successfully decoded the received ranging codes but has insufficient bandwidth to satisfy all requests, as illustrated in FIG. 2.
  Scenario 3: At least two MSs have selected identical ranging codes and ranging slots, as illustrated in FIG. 3.

In all of the scenarios, the MS has no way to detect the problem and has to wait for its timer to expire, which leads to a long delay in the network entry process.

One solution to address the above problem is that, for the scenarios 1 and 2, the BS broadcasts its decoding status in relation to each ranging slot in the subsequent downlink (DL) subframe, as illustrated in FIG. 4.

The reporting of the decoding status can be in the form of a MAC management message or just a bitmap for minimum overhead, as illustrated in FIG. 5. In this example, the ranging status indicator is a bitmap in which each bit represents the decoding status of a corresponding ranging slot in the previous uplink (UL) subframe. In the specific example shown in FIG. 5, the fourth bit, which is a '0', indicates a ranging collision, while the seventh bit, another '0', indicates the drop of the ranging request by the BS due to insufficient bandwidth. The MS, upon receiving the ranging status indicator, cannot know whether its ranging request has collided or been dropped by the BS. However, the MS is able to react to the failure of its ranging immediately.

As for the ranging collision in scenario 3, at this moment there is no way for either the BS or either of the MSs to detect such a collision until the RNG-REQ messages collide. However, by using mechanisms similar to the aforementioned one, the BS can still announce the collision of the RNG-REQ messages instantaneously to avoid the MSs waiting for the expiration of their ranging timers, as illustrated in FIG. 6.

The ranging status indicator in this solution has two states: "1" for success and "0" for failure. However, in some cases, when more than one MS transmits a ranging code in the same ranging slot, the BS can decode some of the ranging codes while failing to decode the rest.

If the BS responds to this case with a "1", the MSs whose ranging codes have failed to be decoded will continue in the normal way, as set out in 16e, which will result in a long latency, as described above.

If the BS responds to this case with a "0", all the MSs which have transmitted ranging codes in the same ranging slot will retransmit ranging codes, including the MSs whose ranging codes were decoded successfully.

SUMMARY

According to a first aspect, there is provided a method of operating a wireless communications system comprising at least one network station and a plurality of subscriber stations, the method comprising
  as part of a network access procedure, each of a number of the subscriber stations selecting a time slot from a plurality of predefined time slots and transmitting an individual code to the network station in the selected time slot;
  at the network station
    receiving and decoding the codes;
    broadcasting a preliminary decoding status report from the network station to the subscriber stations, the preliminary decoding status report comprising a plurality of preliminary decoding status indicators associated with respective time slots, each preliminary decoding status indicator comprising either a positive indicator indicating that one, some or all of the codes received in the respective time slot were decoded successfully, or a negative indicator indicating that none of the codes received in the respective time slot were decoded successfully, the network station associating each positive indicator with a respective detailed decoding status report; and broadcasting from the network station to the subscriber stations the respective detailed decoding status report associated with each time slot in which one or more codes were decoded successfully, each detailed decoding status report identifying each code that was decoded successfully amongst the codes received by the network station in the time slot with which the detailed decoding status report is associated; and at each subscriber station which transmitted a code to the network station, identifying successful decoding only if the preliminary decoding status indicator associated with the time slot in which subscriber station transmitted its code comprises a positive indicator, and if the detailed decoding status report associated with that positive indicator identifies the code transmitted by the subscriber station.

The wireless communications system may comprise any collection of nodes or communication apparatuses which are capable of communicating wirelessly with one another, for example by forming a wireless network. For example, the wireless communications system may comprise a WiMAX network, based on the IEEE 802.16 standards. In another example, the wireless communications system may comprise a telecommunications network which includes a ranging scheme, for example one including an uplink ranging code and a downlink response.

The network station may comprise any apparatus which serves directly or indirectly to control access by other stations to network resources, which may include, for example, permitting access to the resources, allocating bandwidth, monitoring connections, and so on. The network station may comprise, for example, a base station (BS) or a relay station (RS).

The subscriber station (SS) may comprise any apparatus which is used by a user to access network resources. The subscriber station may or may not be portable, and may be intended for location indoors or outdoors. Examples of subscriber stations may include handsets, mobile telephones, smartphones, PC peripherals or components, consumer electronics devices, game terminals and mp3 players. The subscriber station may comprise a mobile station (MS) or user equipment, for example. It is to be understood that the terms SS and MS are used interchangeably, and that the term MS when used does not limit the invention to stations which are mobile.

The network access procedure may comprise any procedure whereby the subscriber station attempts to gain access to network resources via the network station, or any part of such a procedure. In one example, the part of the network access procedure comprises a ranging procedure, in which one or more of power adjustment, timing offset estimation, and synchronization between the network station and subscriber stations within a cell may be undertaken. The ranging procedure may comprise one or more of an initial ranging procedure, a periodic ranging procedure, a handover ranging procedure, and a bandwidth-request ranging procedure.

The time slot may comprise any period of time or window in which it is agreed that the subscriber stations may transmit codes to the network station. In one example, the time slot is a ranging slot. By predefined it may be meant that the timing, position and/or channel in an uplink subframe of each of the number of time slots may be determined before the subscriber station is required to select a time slot.

The subscriber station may select a time slot according to any predetermined criteria. In one example, the subscriber station may randomly select a time slot from the plurality of predefined time slots.

The code may comprise any message or information suitable for initiating the network access procedure, or the relevant part of the network access procedure. In one example, the code may comprise a ranging code. The subscriber station may randomly select the code from a plurality of predefined codes. The code may comprise a CDMA code. The code may or may not identify the subscriber station to the network station.

By transmitting the code in the selected time slot it may be meant that the point in time at which the signaling carrying the code is transmitted coincides with the start of the time slot, or occurs at any time throughout the duration of the time slot.

The detailed decoding status report may comprise any message, information or data whereby it is possible to identify which codes have been successfully decoded. In one example, the detailed decoding status report comprises a list of the codes that have been successfully decoded. In other examples, the detailed decoding status report may comprise details of bandwidth allocation in association with one or more of the listed codes, and/or a ranging response (including for example time/frequency/power adjustment elements) in association with one or more of the listed codes. In a variant, in which the codes are associated with particular subscriber stations, the detailed decoding status report may identify the subscriber stations whose codes have been decoded successfully, or may comprise information allowing those subscriber stations to be identified.

The network station may determine that a code has been decoded successfully if the code belongs to a predetermined code set, for example a ranging code set. The code set may be known to both the network station and the subscriber station.

The method of the first aspect may comprise identifying unsuccessful decoding if no detailed decoding status report is received which is associated with the time slot in which the subscriber station transmitted its code and which identifies that code. For example, the method may comprise identifying unsuccessful decoding if no detailed decoding status report is received which is associated with the time slot in which the subscriber station transmitted its code, or, if a detailed decoding status report is received which is associated with the time slot in which the subscriber station transmitted its code, identifying unsuccessful decoding if the detailed decoding status report does not identify the code.

Identifying successful decoding may be followed by the subscriber station continuing with the part of the network access procedure, proceeding to a subsequent stage of the network access procedure, or moving to a procedure subsequent to the network access procedure, for example.

Identifying unsuccessful decoding may be followed by the subscriber station performing a backoff algorithm. In other examples, it may be followed by the subscriber station abandoning (the part of) the network access procedure, repeating the part of network access procedure (for example for a predetermined number of times), or undertaking an alternative procedure, for example.

More particularly, in the ranging example, when the subscriber station learns that its code has been successfully decoded, if the ranging is initial/handover/periodic ranging, the subscriber station may wait RNG-RSP addressed to itself, and if the ranging is BW ranging, the subscriber station may wait for BW addressed to itself.

If the ranging is initial ranging, handover ranging or periodic ranging, after the ranging code is decoded successfully, the network station may respond by transmitting a RNG-RSP to the subscriber station informing the subscriber station of any power/frequency/time offset and the ranging status. If the status is to continue, the subscriber station may adjust its power, frequency, and time based on the information and transmit another ranging code in the uplink. The status "to continue" relates to the case in which the BS successful decodes the ranging code, but some or all of the attributes, including frequency/time/power, associated with the CDMA ranging code transmission in UL have not satisfied the requirements of the BS completely. So, in the RNG-RSP message, the BS informs the MS of a required adjustment of some or all of frequency/time/power. The MS, based on the information in the RNG-RSP message, adjusts the attributes for CDMA code transmission and sends the CDMA ranging code again. On the other hand, if the status is success, the network station may allocate uplink bandwidth for the subscriber station to transmit a RNG-REQ message. When the subscriber station receives the RNG-RSP message successfully, if the ranging is initial or handover ranging, the next stage may be a capability negotiation procedure, which is a sub-procedure of network entry. If the ranging is an instance of periodic ranging, the subscriber station may go back to normal operation. If the ranging is BW ranging, the network station may broadcast a CDMA-allocation IE to allocate BW for the subscriber station. The subscriber station can then use the BW to transmit anything it wants.

Continuing with the ranging example, identifying unsuccessful decoding may be followed by the subscriber station repeating the ranging procedure, provided that the subscriber station has not yet undertaken a predetermined maximum number, e.g. R, of ranging procedures. After R unsuccessful attempts, if an initial or a handover ranging fails, the subscriber station may scan and try to access another network station, which means that it can't access the current network station. That is, the subscriber station may abandon its attempts on the current network station. If an instance of periodic ranging fails, the subscriber station may initialize MAC to refresh MAC information. If the ranging is BW ranging, the subscriber station may not be able to get the required BW.

In one example, the method may include the subscriber station receiving any detailed decoding status reports broadcast from the network station; determining whether or not there is a detailed decoding status report associated with the time slot in which the subscriber station transmitted its code; if not, identifying unsuccessful decoding; or, if so, accessing the detailed decoding status report and determining whether or not the detailed decoding status report identifies the code which the subscriber station transmitted to the network station. If the detailed decoding status report does not identify the code which the subscriber station transmitted to the network station, the method may comprise identifying unsuccessful decoding; or, if it does, identifying successful decoding.

The method may comprise identifying unsuccessful decoding if the preliminary decoding status indicator associated with the time slot in which subscriber station transmitted its code comprises a negative indicator, or if the preliminary decoding status indicator comprises a positive indicator and the detailed decoding status report associated with that positive indicator does not identify the code transmitted by the subscriber station.

The preliminary decoding status report may comprise a bitmap in which each preliminary decoding status indicator comprises a bit (or more than one bit) representing the decoding status of any codes received in the respective time slot. In one example, a '1' indicates that one, some or all of the codes received in the relevant time slot were decoded successfully, while a '0' indicates that none of the codes received in the relevant time slot were decoded successfully.

In this case, the method may comprise broadcasting the bitmap from the network station to the subscriber stations and receiving the bitmap at the subscriber stations; each subscriber station which transmitted a code determining whether the bit which corresponds to the time slot in which the subscriber station transmitted its code is a '1' or a '0'; if the bit is a '0', identifying unsuccessful decoding; or, if the bit is a '1', accessing the detailed decoding status report associated with that bit to determine whether or not the code which the subscriber station transmitted is identified.

In the method of the first aspect, the time slots may be collected into a plurality of groups of time slots, the method further comprising broadcasting a group preliminary decoding status report from the network station to the subscriber stations, the group preliminary decoding status report comprising a plurality of group preliminary decoding status indicators associated with respective groups of time slots, each group preliminary decoding status indicator comprising either a positive group indicator indicating that one, some or all of the codes received in the respective group of time slots were decoded successfully, or a negative group indicator indicating that none of the codes received in the respective group of time slots were decoded successfully, the network station associating each positive group indicator with a respective preliminary decoding status report; and at each subscriber station which transmitted a code to the network station, identifying successful decoding only if, in the group preliminary decoding status report, the group preliminary decoding status indicator associated with the group of time slots in which the subscriber station transmitted its code comprises a positive group indicator, and if, in the preliminary decoding status report associated with the positive group indicator, the preliminary decoding status indicator associated with the time slot in which the subscriber station transmitted its code comprises a positive indicator, and if the detailed decoding status report associated with that positive indicator identifies the code transmitted by the subscriber station.

The method may comprise identifying unsuccessful decoding if the group preliminary decoding status indicator associated with the group of time slots in which the subscriber station transmitted its code comprises a negative group indicator, or if the group preliminary decoding status indicator comprises a positive group indicator but, in the preliminary decoding status report associated with the positive group indicator, the preliminary decoding status indicator associated with the time slot in which subscriber station transmitted its code comprises a negative indicator, or if the group preliminary decoding status indicator comprises a positive group indicator and the preliminary decoding status indicator comprises a positive indicator, but the detailed decoding status report associated with that positive indicator does not identify the code transmitted by the subscriber station.

The group preliminary decoding status report may comprise a bitmap in which each group preliminary decoding status indicator comprises a bit (or more than one bit) representing the decoding status of any codes received in the respective group of time slots. In one example, a '1' indicates that one, some or all of the codes received in the relevant group of time slots were decoded successfully, while a '0' indicates that none of the codes received in the relevant group of time slots were decoded successfully. In this case, a preliminary decoding status report may be associated with each '1' bit in the bitmap-form group preliminary decoding status report.

In this case, the method may comprise broadcasting the group preliminary decoding status report in bitmap form from the network station to the subscriber stations and receiving the bitmap at the subscriber stations; each subscriber station which transmitted a code determining whether the bit which corresponds to the group of time slots in which the subscriber station transmitted its code is a '1' or a '0'; if the bit is a '0', identifying unsuccessful decoding; or, if the bit is a '1', accessing the preliminary decoding status report associated with that bit. The method may then comprise each subscriber station determining whether the bit in the preliminary decoding status report which corresponds to the time slot in which the subscriber station transmitted its code is a '1' or a '0'; if the bit is a '0', identifying unsuccessful decoding; or, if the bit is a '1', accessing the detailed decoding status report associated with that bit to determine whether or not the code which the subscriber station transmitted is identified.

A group of time slots may comprise one, some or all of the plurality of predefined time slots, with or without additional time slots. The plurality of time slots may constitute one group of time slots, with other such pluralities constituting other groups of time slots.

The preliminary decoding status report and/or the group preliminary decoding status report may be broadcast in the same transmission (e.g. subframe) as the detailed decoding status reports or in a different transmission, e.g. a previous transmission.

The method may comprise the network station broadcasting one, some or all of the group preliminary decoding status report, the preliminary decoding status report and the detailed decoding status report relating to a particular code within a predetermined time period from receiving that code. In one example, the length of the predetermined time period is less than the time taken for the subscriber station to perform a backoff algorithm. For example, the length of the predetermined time period may be less than the duration of a timer associated with the backoff algorithm, for example the T3 timer of the 16e standard.

According to a second aspect, there is provided a method of operating a network station for use in a wireless communications system comprising at least the network station and a plurality of subscriber stations, the method comprising
  receiving and decoding codes transmitted respectively by each of a number of the subscriber stations as part of a network access procedure, each subscriber station having selected a time slot from a plurality of predefined time slots in which to transmit its code;
  broadcasting a preliminary decoding status report to the subscriber stations, the preliminary decoding status report comprising a plurality of preliminary decoding status indicators associated with respective time slots, each preliminary decoding status indicator comprising either a positive indicator indicating that one, some or all of the codes received in the respective time slot were decoded successfully, or a negative indicator indicating that none of the codes received in the respective time slot were decoded successfully, the network station associating each positive indicator with a respective detailed decoding status report; and
  broadcasting to the subscriber stations the respective detailed decoding status report associated with each time slot in which one or more codes were decoded successfully, each detailed decoding status report identifying each code that was decoded successfully amongst the codes received by the network station in the time slot with which the detailed decoding status report is associated.

In the method of the second aspect, the time slots may be collected into a plurality of groups of time slots, and the method may further comprise
  broadcasting a group preliminary decoding status report from the network station to the subscriber stations, the group preliminary decoding status report comprising a plurality of group preliminary decoding status indicators associated with respective groups of time slots, each group preliminary decoding status indicator comprising either a positive group indicator indicating that one, some or all of the codes received in the respective group of time slots were decoded successfully, or a negative group indicator indicating that none of the codes received in the respective group of time slots were decoded successfully, the network station associating each positive group indicator with a respective preliminary decoding status report.

According to a third aspect, there is provided a method of operating a subscriber station for use in a wireless communications system comprising at least one network station and a plurality of the subscriber stations, the method comprising
  as part of a network access procedure, selecting a time slot from a plurality of predefined time slots and transmitting an individual code to the network station in the selected time slot;
  receiving a preliminary decoding status report from the network station, the preliminary decoding status report comprising a plurality of preliminary decoding status indicators associated with respective time slots, each preliminary decoding status indicator comprising either a positive indicator indicating that one, some or all of the codes received in the respective time slot were decoded successfully, or a negative indicator indicating that none of the codes received in the respective time slot were decoded successfully, each positive indicator being associated with a respective detailed decoding status report;
  receiving from the network station any detailed decoding status reports associated with respective time slots in which one or more codes were decoded successfully, each detailed decoding status report identifying each code that was decoded successfully amongst the codes received by the network station in the time slot with which the detailed decoding status report is associated; and
  identifying successful decoding only if the preliminary decoding status indicator associated with the time slot in which subscriber station transmitted its code comprises a positive indicator, and if the detailed decoding status report associated with that positive indicator identifies the code transmitted by the subscriber station.

The method may comprise identifying unsuccessful decoding if the preliminary decoding status indicator associated with the time slot in which subscriber station transmitted its code comprises a negative indicator, or if the preliminary decoding status indicator comprises a positive indicator and the detailed decoding status report associated with that positive indicator does not identify the code transmitted by the subscriber station.

In the method of the third aspect, the time slots may be collected into a plurality of groups of time slots, and the method may further comprise receiving a group preliminary decoding status report from the network station, the group preliminary decoding status report comprising a plurality of group preliminary decoding status indicators associated with respective groups of time slots, each group preliminary decoding status indicator comprising either a positive group indicator indicating that one, some or all of the codes received in the respective group of time slots were decoded successfully, or a negative group indicator indicating that none of the codes received in the respective group of time slots were decoded successfully, each positive group indicator being associated with a respective preliminary decoding status report; and identifying successful decoding only if, in the group preliminary decoding status report, the group preliminary decoding status indicator associated with the group of time slots in which the subscriber station transmitted its code comprises a positive group indicator, and if, in the preliminary decoding status report associated with the positive group indicator, the preliminary decoding status indicator associated with the time slot in which the subscriber station transmitted its code comprises a positive indicator, and if the detailed decoding status report associated with that positive indicator identifies the code transmitted by the subscriber station.

The method may comprise identifying unsuccessful decoding if the group preliminary decoding status indicator associated with the group of time slots in which the subscriber station transmitted its code comprises a negative group indicator, or if the group preliminary decoding status indicator comprises a positive group indicator but, in the preliminary decoding status report associated with the positive group indicator, the preliminary decoding status indicator associated with the time slot in which subscriber station transmitted its code comprises a negative indicator, or if the group preliminary decoding status indicator comprises a positive group indicator and the preliminary decoding status indicator comprises a positive indicator, but the detailed decoding status report associated with that positive indicator does not identify the code transmitted by the subscriber station.

In any aspect, at least one detailed decoding status report may further comprise data specifying a respective bandwidth allocation and/or a respective ranging response associated with each code that was decoded successfully.

According to a fourth aspect, there is provided a wireless communications system comprising at least one network station and a plurality of subscriber stations, wherein each of a number of the subscriber stations is configured to select a time slot from a plurality of predefined time slots and to transmit an individual code to the network station in the selected time slot as part of a network access procedure;

the network station is configured to receive and decode the codes;

the network station is configured to broadcast a preliminary decoding status report to the subscriber stations, the preliminary decoding status report comprising a plurality of preliminary decoding status indicators associated with respective time slots, each preliminary decoding status indicator comprising either a positive indicator indicating that one, some or all of the codes received in the respective time slot were decoded successfully, or a negative indicator indicating that none of the codes received in the respective time slot were decoded successfully, the network station being configured to associate each positive indicator with a respective detailed decoding status report; and the network station is further configured to broadcast to the subscriber stations the respective detailed decoding status report associated with each time slot in which one or more codes were decoded successfully, each detailed decoding status report identifying each code that was decoded successfully amongst the codes received by the network station in the time slot with which the detailed decoding status report is associated; and wherein each subscriber station which transmitted a code to the network station is configured to identify successful decoding only if the preliminary decoding status indicator associated with the time slot in which subscriber station transmitted its code comprises a positive indicator, and if the detailed decoding status report associated with that positive indicator identifies the code transmitted by the subscriber station.

Each subscriber station may be configured to identify unsuccessful decoding if the preliminary decoding status indicator associated with the time slot in which subscriber station transmitted its code comprises a negative indicator, or if the preliminary decoding status indicator comprises a positive indicator and the detailed decoding status report associated with that positive indicator does not identify the code transmitted by the subscriber station.

In the wireless communications system of the fourth aspect, the time slots may be collected into a plurality of groups of time slots, and wherein the network station may be configured to broadcast a group preliminary decoding status report to the subscriber stations, the group preliminary decoding status report comprising a plurality of group preliminary decoding status indicators associated with respective groups of time slots, each group preliminary decoding status indicator comprising either a positive group indicator indicating that one, some or all of the codes received in the respective group of time slots were decoded successfully, or a negative group indicator indicating that none of the codes received in the respective group of time slots were decoded successfully, the network station being configured to associate each positive group indicator with a respective preliminary decoding status report; and each subscriber station which transmitted a code to the network station may be configured to identify successful decoding only if, in the group preliminary decoding status report, the group preliminary decoding status indicator associated with the group of time slots in which the subscriber station transmitted its code comprises a positive group indicator, and if, in the preliminary decoding status report associated with the positive group indicator, the preliminary decoding status indicator associated with the time slot in which the subscriber station transmitted its code comprises a positive indicator, and if the detailed decoding status report associated with that positive indicator identifies the code transmitted by the subscriber station.

Each subscriber station may be configured to identify unsuccessful decoding if the group preliminary decoding status indicator associated with the group of time slots in which the subscriber station transmitted its code comprises a negative group indicator, or if the group preliminary decoding status indicator comprises a positive group indicator but, in the preliminary decoding status report associated with the positive group indicator, the preliminary decoding status indicator associated with the time slot in which subscriber station transmitted its code comprises a negative indicator, or if the group preliminary decoding status indicator comprises a positive group indicator and the preliminary decoding status indicator comprises a positive indicator, but the detailed decoding status report associated with that positive indicator does not identify the code transmitted by the subscriber station.

According to a fifth aspect, there is provided apparatus for a network station for use in a wireless communications system comprising at least the network station and a plurality of subscriber stations, the apparatus comprising preliminary decoding status circuitry configured to prepare a preliminary decoding status report comprising a plurality of preliminary decoding status indicators associated with respective time slots, each preliminary decoding status indicator comprising either a positive indicator indicating that one, some or all of the codes received in the respective time slot were decoded successfully, or a negative indicator indicating that none of the codes received in the respective time slot were decoded successfully, the preliminary decoding status circuitry being configured to associate each positive indicator with a respective detailed decoding status report; and detailed decoding status circuitry configured to obtain data identifying one or more codes which have decoded successfully by decoding circuitry of the network station, the codes having been transmitted to the network station respectively by each of a number of the subscriber stations as part of a network access procedure, each subscriber station having selected a time slot from a plurality of predefined time slots in which to transmit its code; wherein the detailed decoding status circuitry is configured to prepare a respective detailed decoding status report associated with each time slot in which one or more codes were decoded successfully, each detailed decoding status report identifying each code that was decoded successfully amongst the codes received by the network station in the time slot with which the detailed decoding status report is associated, the detailed decoding status reports being for broadcast to the subscriber stations.

The apparatus may comprise communications circuitry configured to receive codes from the subscriber stations. The communications circuitry may be configured to broadcast the preliminary and detailed decoding status reports to the subscriber stations.

The apparatus may comprise the decoding circuitry, which may be configured to obtain codes from the communications circuitry, decode them and pass decoding results to the decoding status circuitry. The decoding results may comprise a list of codes which have been decoded successfully, or the successfully-decoded codes themselves. The decoding status circuitry may receive only successfully-decoded codes from the decoding circuitry, or may also receive unsuccessfully-decoded codes.

In the case that the preliminary decoding status report comprises a bitmap, the preliminary decoding status circuitry may be configured to prepare the preliminary decoding status report in bitmap form, and the communications circuitry may be configured to broadcast the bitmap from the network station to the subscriber stations.

In the apparatus of the fifth aspect, the time slots may be collected into a plurality of groups of time slots, and the decoding status circuitry may comprise group preliminary decoding status circuitry configured to prepare a group preliminary decoding status report comprising a plurality of group preliminary decoding status indicators associated with respective groups of time slots, each group preliminary decoding status indicator comprising either a positive group indicator indicating that one, some or all of the codes received in the respective group of time slots were decoded successfully, or a negative group indicator indicating that none of the codes received in the respective group of time slots were decoded successfully, the group preliminary decoding status circuitry being configured to associate each positive group indicator with a respective preliminary decoding status report.

The communications circuitry may be configured to broadcast the group preliminary decoding status report to the subscriber stations.

In the case that the group preliminary decoding status report comprises a bitmap, the communications circuitry may be configured to broadcast the group preliminary decoding status report in bitmap form from the network station to the subscriber stations.

According to a sixth aspect, there is provided apparatus for a subscriber station for use in a wireless communications system comprising at least one network station and a plurality of the subscriber stations, the apparatus comprising network access circuitry configured to obtain information identifying a time slot selected from a plurality of predefined time slots and an individual code transmitted from the subscriber station to the network station in the selected time slot as part of a network access procedure;

the network access circuitry being configured to receive a preliminary decoding status report from the network station, the preliminary decoding status report comprising a plurality of preliminary decoding status indicators associated with respective time slots, each preliminary decoding status indicator comprising either a positive indicator indicating that one, some or all of the codes received in the respective time slot were decoded successfully, or a negative indicator indicating that none of the codes received in the respective time slot were decoded successfully, each positive indicator being associated with a respective detailed decoding status report; and wherein the network access circuitry is configured to receive from the network station any detailed decoding status reports associated with respective time slots in which one or more codes were decoded successfully, each detailed decoding status report identifying each code that was decoded successfully amongst the codes received by the network station in the time slot with which the detailed decoding status report is associated; and the network access circuitry being configured to identify successful decoding only if the preliminary decoding status indicator associated with the time slot in which subscriber station transmitted its code comprises a positive indicator, and if the detailed decoding status report associated with that positive indicator identifies the code transmitted by the subscriber station.

The network access circuitry may be configured to select the code and/or the time slot. In one example, the network access circuitry is configured to randomly select the time slot from the plurality of predefined time slots, and to randomly select the code from a plurality of predefined codes.

The apparatus may comprise communications circuitry configured to transmit the code from the subscriber station to the network station in the selected time slot, and/or to receive the preliminary and detailed decoding status reports.

The network access circuitry may be configured to identify unsuccessful decoding if the preliminary decoding status indicator associated with the time slot in which subscriber station transmitted its code comprises a negative indicator, or if the preliminary decoding status indicator comprises a positive indicator and the detailed decoding status report associated with that positive indicator does not identify the code transmitted by the subscriber station.

In the case that the preliminary decoding status report comprises a bitmap, the communications circuitry may be configured to receive the bitmap at the subscriber station. The network access circuitry may be configured to determine whether the bit which corresponds to the time slot in which the subscriber station transmitted its code is a '1' or a '0'; if the bit is a '0', to identify unsuccessful decoding; or, if the bit is a '1', to access the detailed decoding status report associated with that bit to determine whether or not the code which the subscriber station transmitted is identified.

In the apparatus of the sixth aspect, the time slots may be collected into a plurality of groups of time slots, and the network access circuitry may be configured to receive a group preliminary decoding status report from the network station, the group preliminary decoding status report comprising a plurality of group preliminary decoding status indicators associated with respective groups of time slots, each group preliminary decoding status indicator comprising either a positive group indicator indicating that one, some or all of the codes received in the respective group of time slots were decoded successfully, or a negative group indicator indicating that none of the codes received in the respective group of time slots were decoded successfully, each positive group indicator being associated with a respective preliminary decoding status report; and to identify successful decoding only if, in the group preliminary decoding status report, the group preliminary decoding status indicator associated with the group of time slots in which the subscriber station transmitted its code comprises a positive group indicator, and if, in the preliminary decoding status report associated with the positive group indicator, the preliminary decoding status indicator associated with the time slot in which the subscriber station transmitted its code comprises a positive indicator, and if the detailed decoding status report associated with that positive indicator identifies the code transmitted by the subscriber station.

The network access circuitry may be configured to identify unsuccessful decoding if the group preliminary decoding status indicator associated with the group of time slots in which the subscriber station transmitted its code comprises a negative group indicator, or if the group preliminary decoding status indicator comprises a positive group indicator but, in the preliminary decoding status report associated with the positive group indicator, the preliminary decoding status indicator associated with the time slot in which subscriber station transmitted its code comprises a negative indicator, or if the group preliminary decoding status indicator comprises a positive group indicator and the preliminary decoding status indicator comprises a positive indicator, but the detailed decoding status report associated with that positive indicator does not identify the code transmitted by the subscriber station.

The communications circuitry may be configured to receive the group preliminary decoding status report.

In the case that the group preliminary decoding status report comprises a bitmap, the communications circuitry may be configured to receive the bitmap at the subscriber station; and the network access circuitry may be configured to determine whether the bit which corresponds to the group of time slots in which the subscriber station transmitted its code is a '1' or a '0'; if the bit is a '0', to identify unsuccessful decoding; or, if the bit is a '1', to access the preliminary decoding status report associated with that bit. The network access circuitry may be configured to determine whether the bit in the preliminary decoding status report which corresponds to the time slot in which the subscriber station transmitted its code is a '1' or a '0'; if the bit is a '0', to identify unsuccessful decoding; or, if the bit is a '1', to access the detailed decoding status report associated with that bit to determine whether or not the code which the subscriber station transmitted is identified.

In the wireless communications system or apparatus of any of the fourth to sixth aspects, at least one detailed decoding status report may further comprise data specifying a respective bandwidth allocation and/or a respective ranging response associated with each code that was decoded successfully.

According to a seventh aspect, there is provided a computer program which, when run on a computer, causes the computer to perform the method as claimed in any of the first to third aspects, or to become the apparatus as claimed in any of the fourth to sixth aspects, the computer program optionally being carried by a carrier medium, wherein the carrier medium is preferably a recording medium or a transmission medium.

Any circuitry may include one or more processors, memories and bus lines. One or more of the circuitries described may share circuitry elements.

The present invention includes one or more aspects, embodiments or features in isolation or in various combinations whether or not specifically stated (including claimed) in that combination or in isolation.

The above summary is intended to be merely exemplary and non-limiting.

BRIEF DESCRIPTION OF THE DRAWINGS

A description is now given, by way of example only, with reference to the accompanying drawings, in which:—

FIG. 9 illustrates a relationship between a group preliminary decoding status report (a group ranging status bitmap), two preliminary decoding status reports (ranging status bitmaps) and three detailed decoding status reports (ranging status information reports);

DETAILED DESCRIPTION

Embodiments of the invention may provide a new method to reduce the latency of a ranging procedure.

Figure 12:
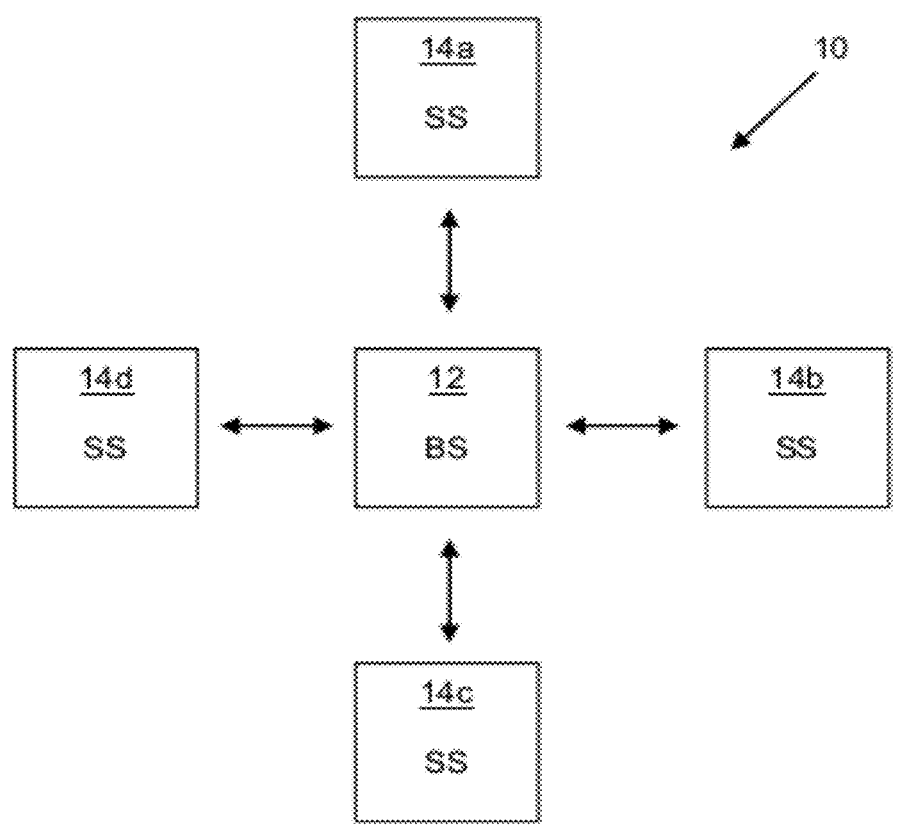
FIG. 12 is a block diagram showing a wireless communications system.

FIG. 12 shows a wireless communications system 10 comprising a network station, which in this case is a base station 12, and a number of subscriber stations 14, labelled 14a-d. In this example, the wireless communications system 10 is a WiMAX network, based on the IEEE 802.16 standards.

Figure 13:
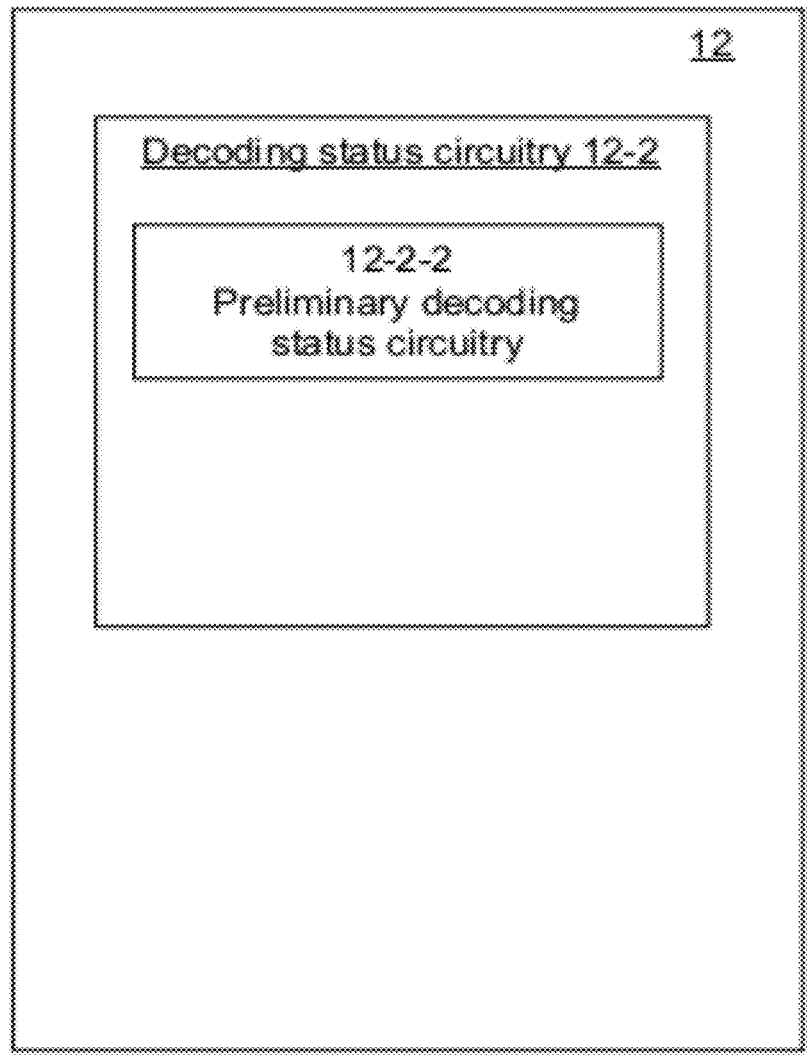
FIG. 13 is a block diagram showing an example of a base station.

FIG. 13 is a block diagram of an example of the base station 12. The base station 12 includes decoding status circuitry 12-2 configured to prepare detailed decoding status reports, the purpose of which will be explained later.

Figure 15:
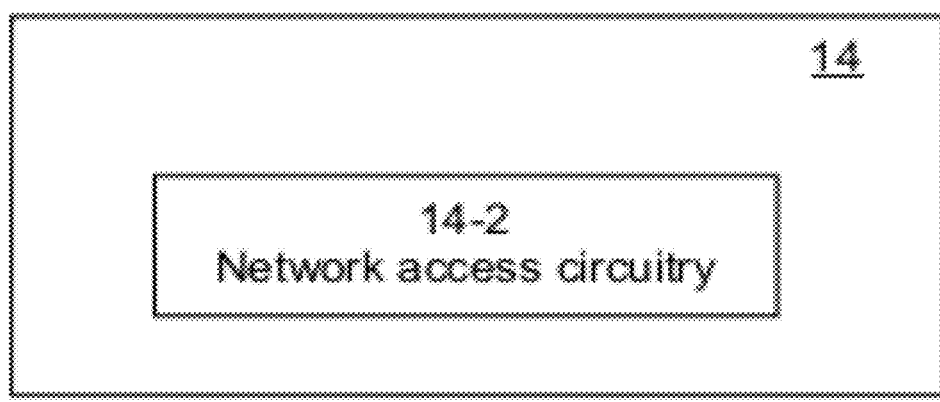
FIG. 15 is a block diagram showing an example of a subscriber station.

FIG. 15 is a block diagram of an example of a subscriber station 14. The subscriber station 14 includes network access circuitry 14-2.

In use, the subscriber stations 14 undertake a network access procedure to attempt to gain access to network resources controlled by the base station 12. In this example, a part of the network access procedure comprises a ranging procedure.

A number of examples of methods of operating the wireless communication system 10 will now be described. Unless indicated otherwise, a feature of one example is the same as the equivalent feature of a previously-described example.

Figure 10:
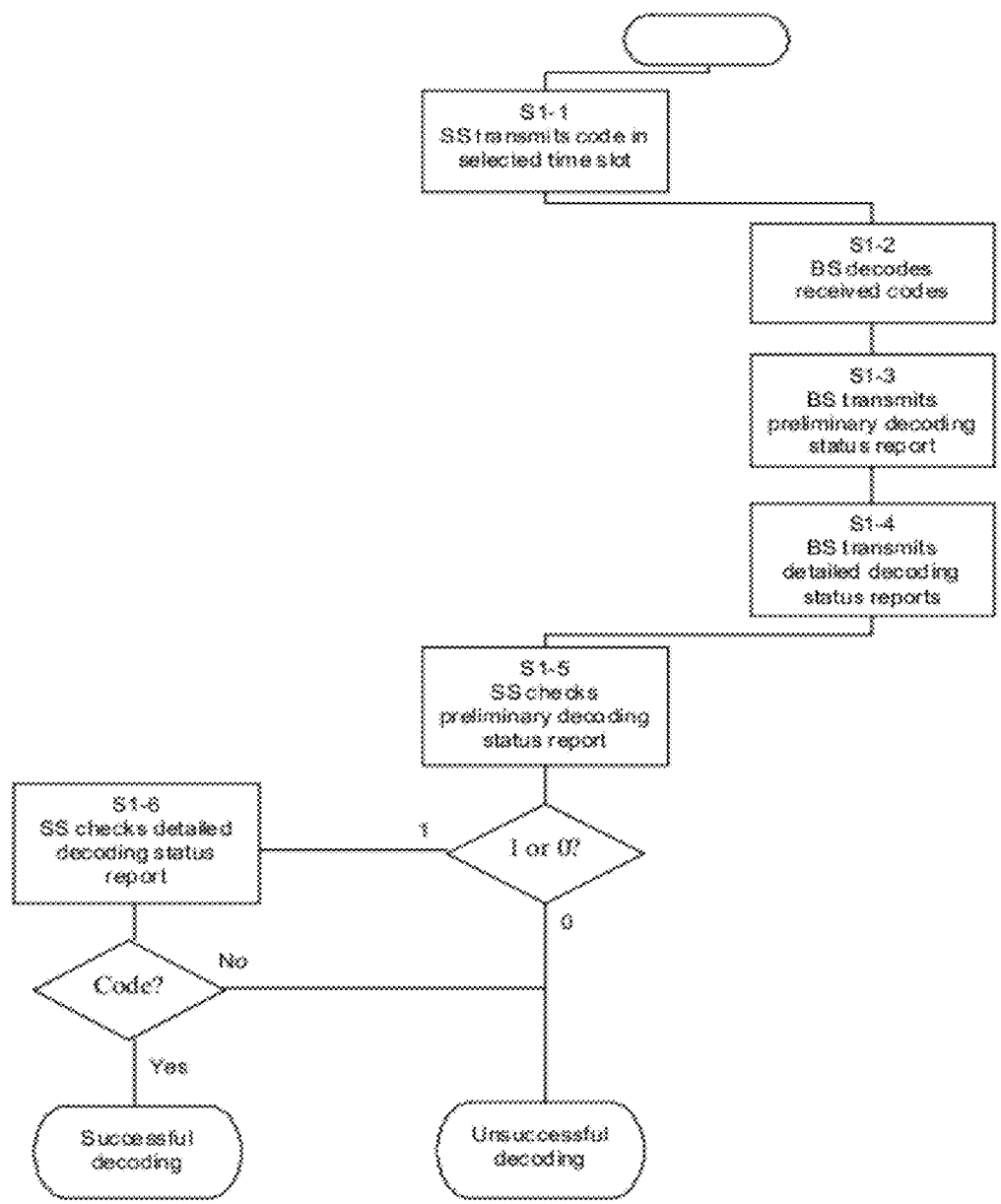
FIG. 10 is a flowchart representing an example of a method of operating a wireless communications system.

FIG. 10 is a flowchart representing an example of a method of operating the wireless communications system 10.

In step S1-1, a subscriber station 14 transmits a ranging code to the base station 12 during a selected ranging slot. In this example, the code is a ranging code and the time slot is a ranging slot.

In step S1-2, the base station 12 undertakes a decoding process on the ranging code received from the subscriber station 14. The base station 12 may also undertake the decoding process on ranging codes received from other subscriber stations 14, received in the same ranging slot or in different ranging slots.

In step S1-3, the base station 12 transmits a preliminary decoding status report to the subscriber stations 14. The preliminary decoding status report comprises a plurality of preliminary decoding status indicators associated with respective ranging slots, and is prepared by the decoding status circuitry 12-2. Each preliminary decoding status indicator comprises either a positive indicator indicating that one, some or all of the ranging codes received in the respective ranging slot were decoded successfully, or a negative indicator indicating that none of the ranging codes received in the respective ranging slot were decoded successfully. In this example, the preliminary decoding status report comprises a ranging status bitmap, shown in FIG. 7, in which each preliminary decoding status indicator is a bit. In this example, a '1' is a positive indicator and a '0' is a negative indicator. The decoding status circuitry 12-2 associates each positive indicator or '1' with a respective detailed decoding status report, or ranging status information report, as indicated by the arrows in FIG. 7.

In step S1-4, the base station 12 transmits detailed decoding status reports to the subscriber stations 14. The base station 12 transmits a respective detailed decoding status report associated with each '1' in the preliminary decoding status report. Each detailed decoding status report identifies each ranging code that was decoded successfully amongst the ranging codes received by the base station 12 in the ranging slot with which the detailed decoding status report is associated. Examples of detailed decoding status reports are shown in FIG. 8, and are described later with reference to that figure.

In step S1-5, the network access circuitry 14-2 of each subscriber station 14 which transmitted a ranging code checks the preliminary decoding status report to determine whether the bit which corresponds to the ranging slot in which it transmitted its code is a '1' or a '0'. If the bit is a '0', the network access circuitry 14-2 identifies unsuccessful decoding. If the bit is a '1', the network access circuitry 14-2 proceeds to step S2-6.

In step S1-6, the network access circuitry 14-2 checks the detailed decoding status report associated with the '1' to determine whether or not the ranging code which the subscriber station 14 transmitted is identified. If not, the network access circuitry 14-2 identifies unsuccessful decoding. Otherwise, the network access circuitry 14-2 identifies successful decoding and proceeds accordingly.

Figure 11:
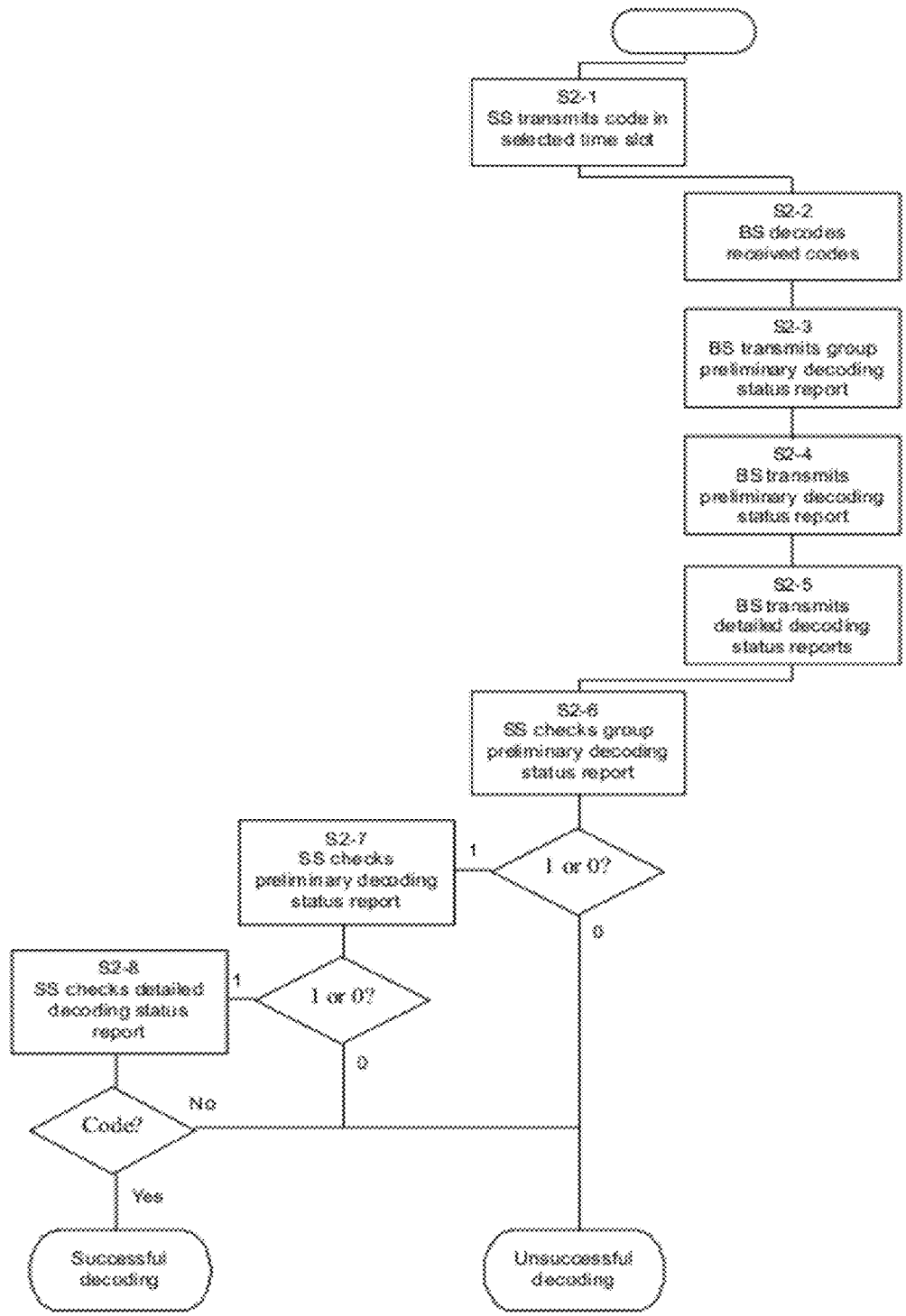
FIG. 11 is a flowchart representing another example of a method of operating a wireless communications system.

FIG. 11 is a flowchart representing a further example of a method of operating the wireless communications system 10. The method of FIG. 11 differs from that of FIG. 10 mainly in the use of a group preliminary decoding status report by the base station 12 and subscriber stations 14.

In this example, there are a number of uplink frames each having a plurality of ranging slots, such that the ranging slots are collected into a plurality of groups of ranging slots.

In step S2-1, a subscriber station 14 transmits a ranging code to the base station 12 during a selected ranging slot.

In step S2-2, the base station 12 undertakes a decoding process on the ranging code received from the subscriber station 14.

In step S2-3, the base station 12 transmits a group preliminary decoding status report to the subscriber stations 14. The group preliminary status report comprises a plurality of group preliminary decoding status indicators associated with respective groups of ranging slots, and is prepared by the decoding status circuitry 12-2. Each group preliminary decoding status indicator comprising either a positive group indicator indicating that one, some or all of the ranging codes received in the respective group of ranging slots were decoded successfully, or a negative group indicator indicating that none of the ranging codes received in the respective group of ranging slots were decoded successfully. In this example, the group preliminary decoding status report comprises a group ranging status bitmap, shown in FIG. 9, in which each group preliminary decoding status indicator is a bit. In the example, a '1' is a positive group indicator and a '0' is a negative group indicator. The decoding status circuitry 12-2 associates each positive group indicator or '1' with a respective preliminary decoding status report, as indicated by the arrows in the upper layer of FIG. 9.

In step S2-4, the base station 12 transmits the preliminary decoding status reports to the subscriber stations 14. In this example, each preliminary decoding status report comprises a ranging status bitmap, shown in FIG. 9, in which each preliminary decoding status indicator is a bit. In this example, a '1' is a positive indicator and a '0' is a negative indicator. The decoding status circuitry 12-2 associates each positive indicator or '1' with a respective detailed decoding status report, or ranging status information report, as indicated by the arrows in the lower layer of FIG. 9.

In step S2-5, the base station 12 transmits detailed decoding status reports to the subscriber stations 14. The base station 12 transmits a respective detailed decoding status report associated with each '1' in each preliminary decoding status report.

In step S2-6, the network access circuitry 14-2 of each subscriber station 14 which transmitted a ranging code checks the group preliminary decoding status report to determine whether the bit which corresponds to the group of ranging slots (i.e. the uplink subframe) in which it transmitted its code is a '1' or a '0'. If the bit is a '0', the network access circuitry 14-2 identifies unsuccessful decoding. If the bit is a '1', the network access circuitry 14-2 proceeds to step S2-7.

In step S2-7, the network access circuitry 14-2 of each subscriber station 14 which transmitted a ranging code checks the preliminary decoding status report associated with the '1' in the group preliminary decoding status report which corresponds to the group of ranging slots in which it transmitted its code, in order to determine whether the bit which corresponds to the ranging slot in which it transmitted its code is a '1' or a '0'. If the bit is a '0', the network access circuitry 14-2 identifies unsuccessful decoding. If the bit is a '1', the network access circuitry 14-2 proceeds to step S2-8.

In step S2-8, the network access circuitry 14-2 checks the detailed decoding status report associated with the '1' in the relevant preliminary decoding status report to determine whether or not the ranging code which the subscriber station 14 transmitted is identified. If not, the network access circuitry 14-2 identifies unsuccessful decoding. Otherwise, the network access circuitry 14-2 identifies successful decoding and proceeds accordingly.

In the examples described, the preliminary decoding status report and/or the group preliminary decoding status report are transmitted in the same downlink subframe as the detailed decoding status reports. However, in other examples, the preliminary decoding status report and/or the group preliminary decoding status report are transmitted in one or more previous downlink subframes.

FIG. 8 shows examples of detailed decoding status reports.

Figure 8A:
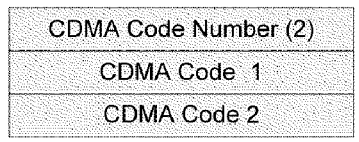
FIGS. 8A to 8D illustrate examples of detailed decoding status reports.

FIG. 8A shows a basic detailed decoding status report in which all successfully decoded ranging codes (CDMA codes/identifiers) are listed.

Figure 8B:
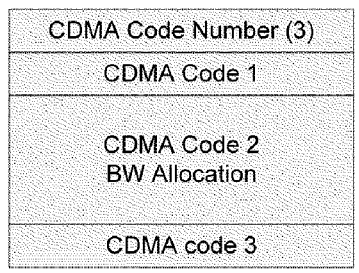

FIG. 8B shows a detailed decoding status report which is useful in the case that the ranging code (the CDMA code) is for a bandwidth (BW) request. The base station 12 can allocate the BW as well as reporting the decoding status, and the BW allocation can be carried in the detailed decoding status report at the same time. In this example, the subscriber station 14 which transmitted CDMA Code 2 is allocated some bandwidth, as specified in the report. Because the ranging slot used by the subscriber station is known (owing to the mapping between the preliminary decoding status report, or ranging status bitmap, and the ranging slot), in each detailed decoding status report, bandwidth allocation need only be issued for a specific CDMA ranging code, without also having to specify that the allocation is for a specific ranging slot (which may entail specifying the frame number index, ranging symbol, and ranging subchannel, for example). This reduces the overhead of the CDMA allocation scheme adopted in the 16d/e/j standards.

Figure 8C:
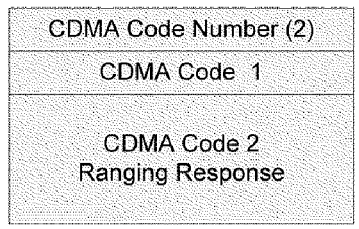

FIG. 8C shows a detailed decoding status report which is useful in the case that the ranging code (the CDMA code) is for initial ranging. The ranging response can also be contained in the detailed decoding status report. Similarly, the ranging response need only be issued for a specific CDMA ranging code. In the ranging response, the time/frequency/power adjustment elements may be carried, as in a 16d/e/j system.

Figure 8D:
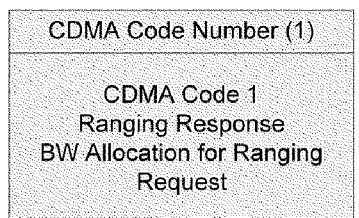

FIG. 8D shows an example of a detailed decoding status report which includes both a ranging response and a bandwidth allocation for ranging, which is useful in the case that the base station 12 allocates the uplink BW for the subscriber station 14 to send the ranging request.

FIG. 13 is a block diagram showing an example of the base station 12. The base station includes the decoding status circuitry 12-2, which further includes preliminary decoding status circuitry 12-2-2.

The preliminary decoding status circuitry 12-2-2 is configured to prepare the preliminary decoding status reports and associate each positive indicator with a respective detailed decoding status report prepared by the decoding status circuitry 12-2.

Figure 14:
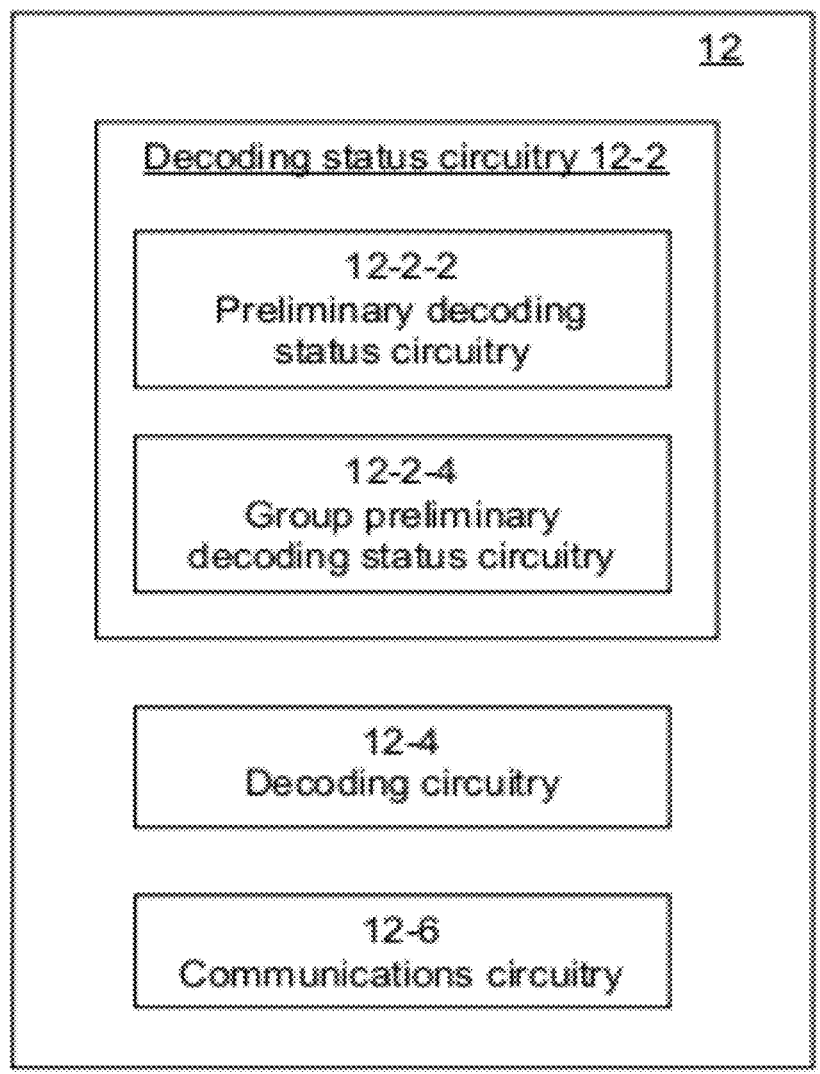
FIG. 14 is a block diagram showing another example of a base station.

FIG. 14 shows another example of the base station 12, in which the decoding status circuitry 12-2 further comprises group preliminary decoding status circuitry 12-2-4, and in which the base station 12 comprises decoding circuitry 12-4 and communications circuitry 12-6.

The group preliminary decoding status circuitry 12-2-4 is configured to prepare the group preliminary decoding status report and to associate each positive group indicator with a respective preliminary decoding status report prepared by the preliminary decoding status circuitry 12-2-2.

The decoding circuitry 12-4 is configured to obtain ranging codes from the communications circuitry 12-6, decode them and pass decoding results to the decoding status circuitry 12-2.

The communications circuitry 12-6 is configured to receive ranging codes from the subscriber stations 14, and to broadcast the group preliminary decoding status reports, preliminary decoding status reports and detailed decoding status reports to the subscriber stations 14.

Figure 16:
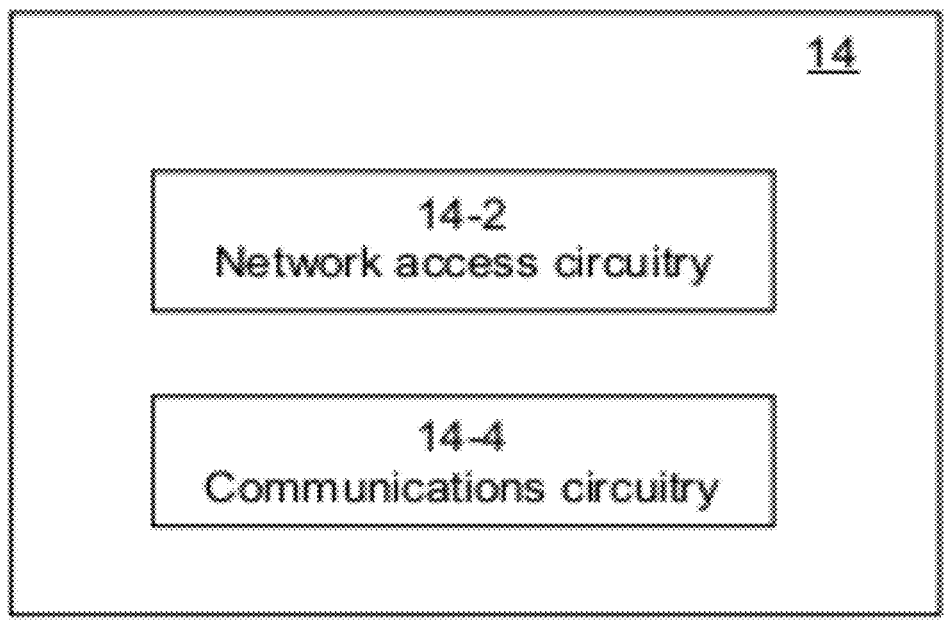
FIG. 16 is a block diagram showing another example of a subscriber station.

FIG. 16 is a block diagram showing another example of the subscriber station 14. The subscriber station 14 includes the network access circuitry 14-2, as before, and further includes communications circuitry 14-4.

The network access circuitry 14-2 is configured to randomly select the ranging code from a plurality of predefined codes and to randomly select the ranging slot from a plurality of predefined ranging slots.

The communications circuitry 14-4 is configured to transmit the ranging code from the subscriber station 14 to the base station 12 in the selected ranging slot, and to receive the group preliminary decoding status reports, preliminary decoding status reports and detailed decoding status reports from the base station 12.

Figure 1:
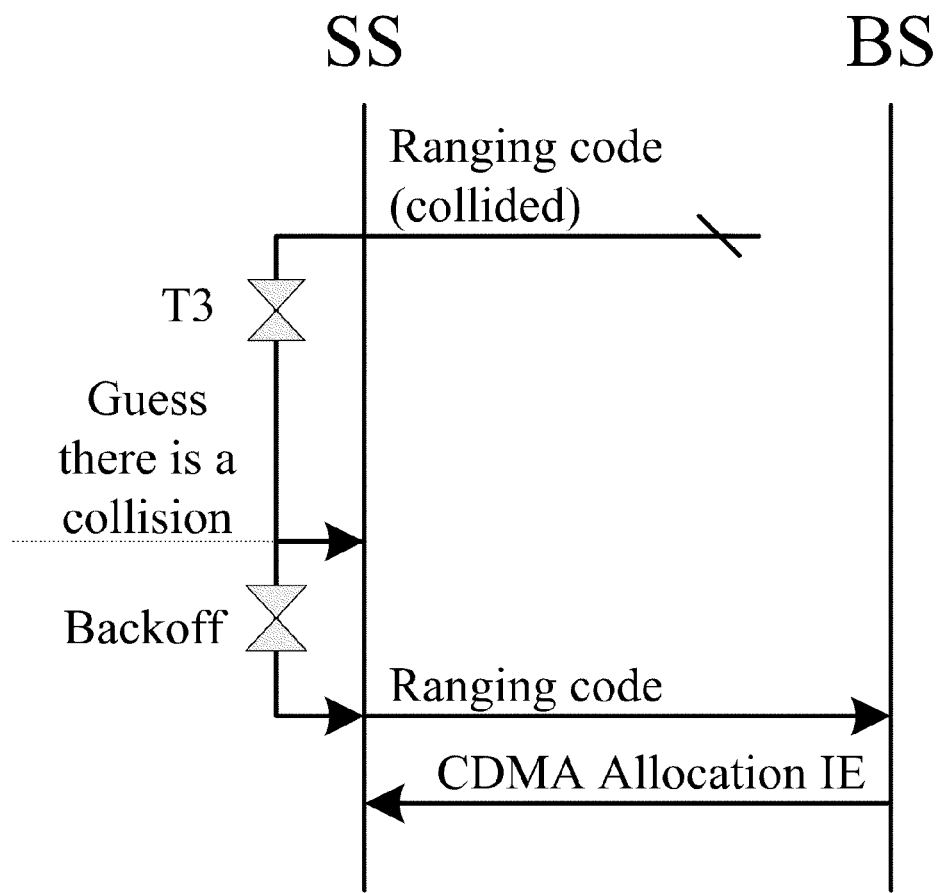
FIG. 1 illustrates a ranging failure caused by ranging code collision.
Figure 2:
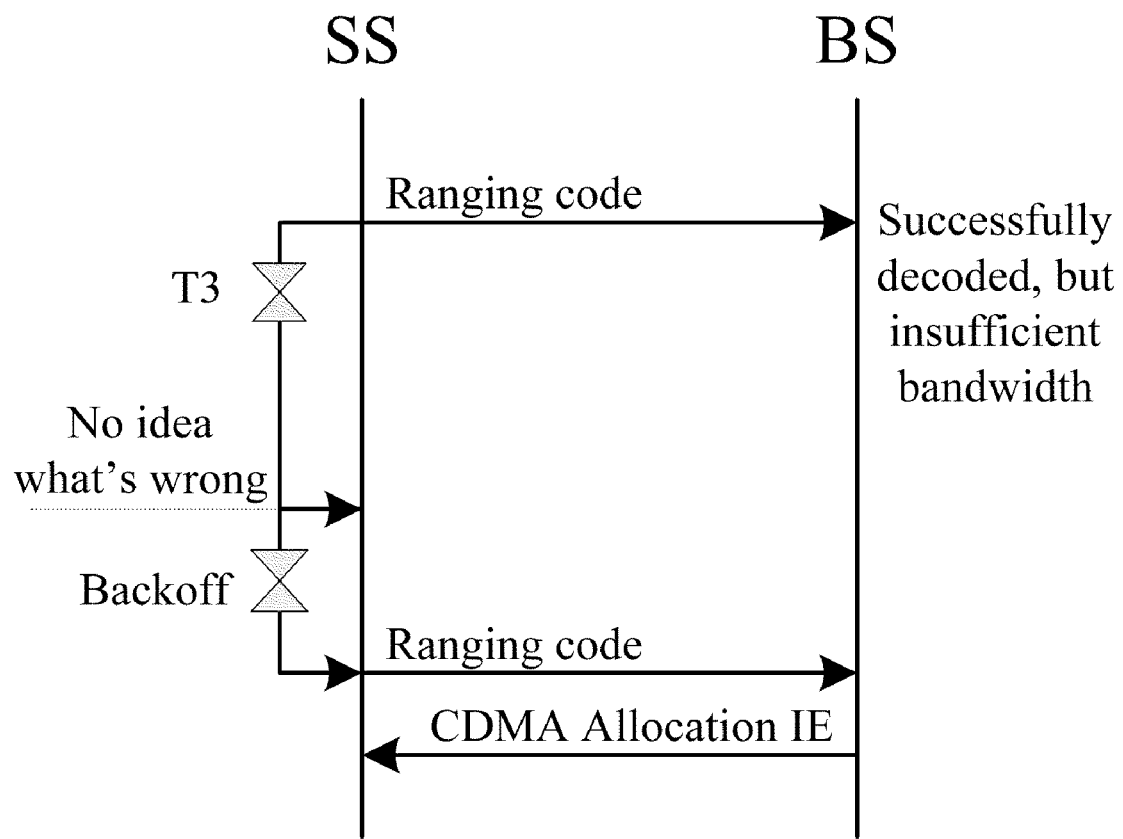
FIG. 2 illustrates a ranging failure due to insufficient bandwidth.
Figure 3:
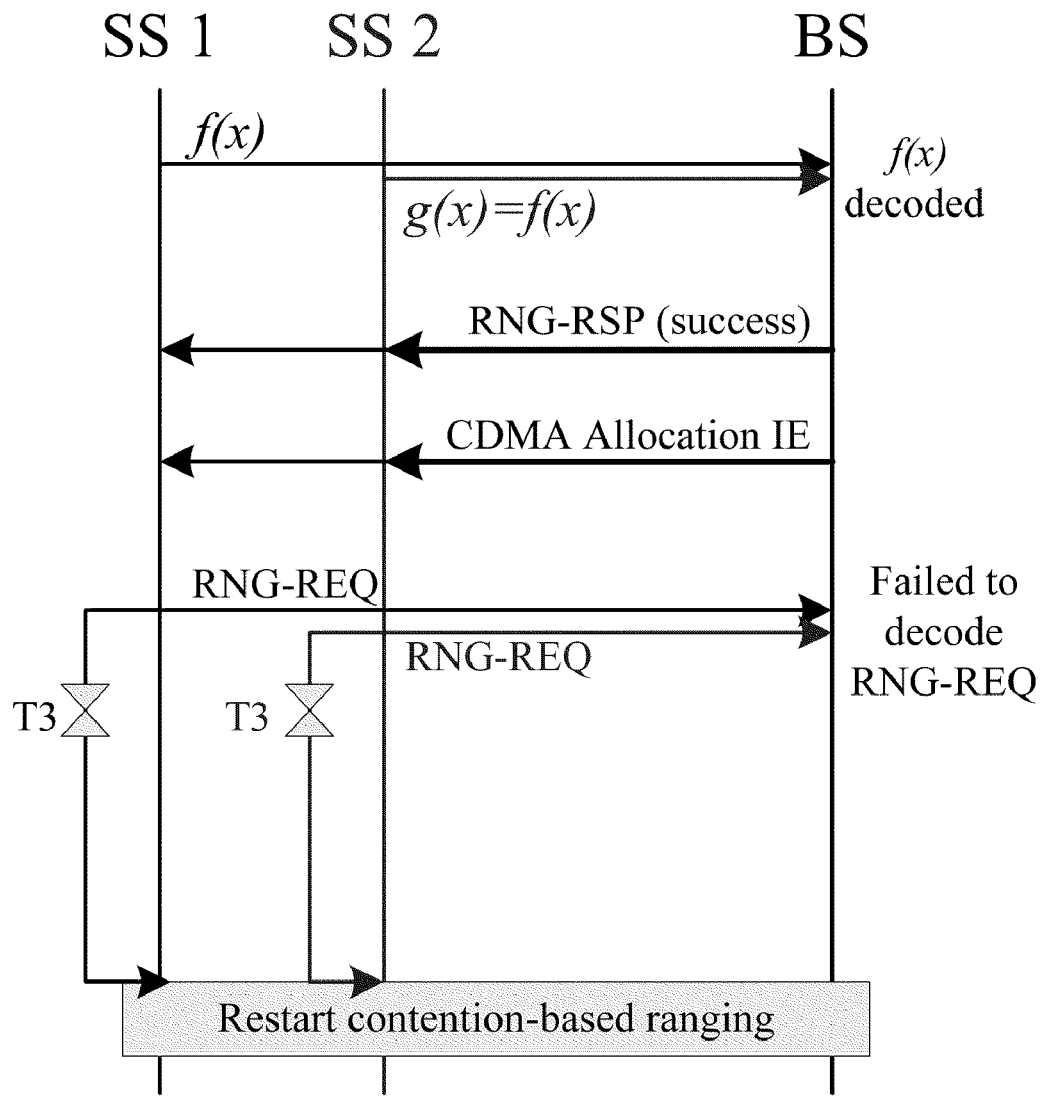
FIG. 3 illustrates a ranging failure due to two mobile stations having selected identical ranging codes and ranging slots.
Figure 4:
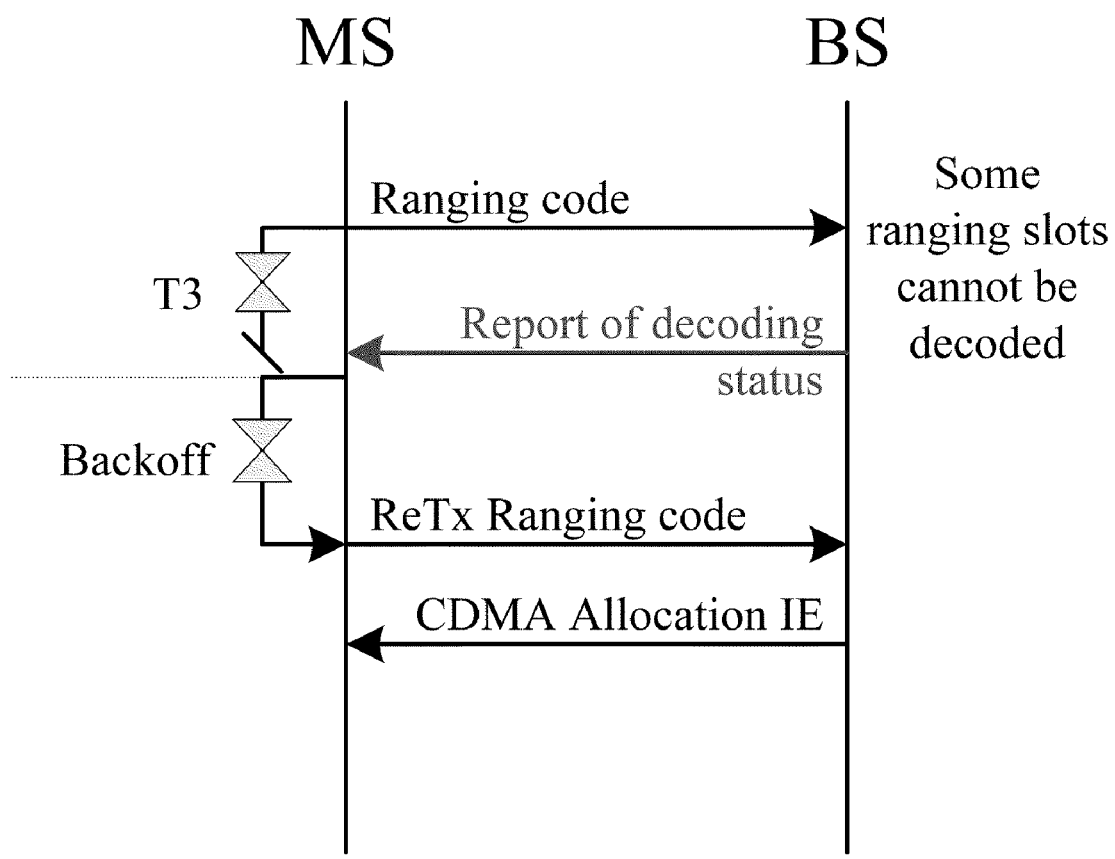
FIG. 4 illustrates the reporting of the ranging code decoding status.
Figure 5:
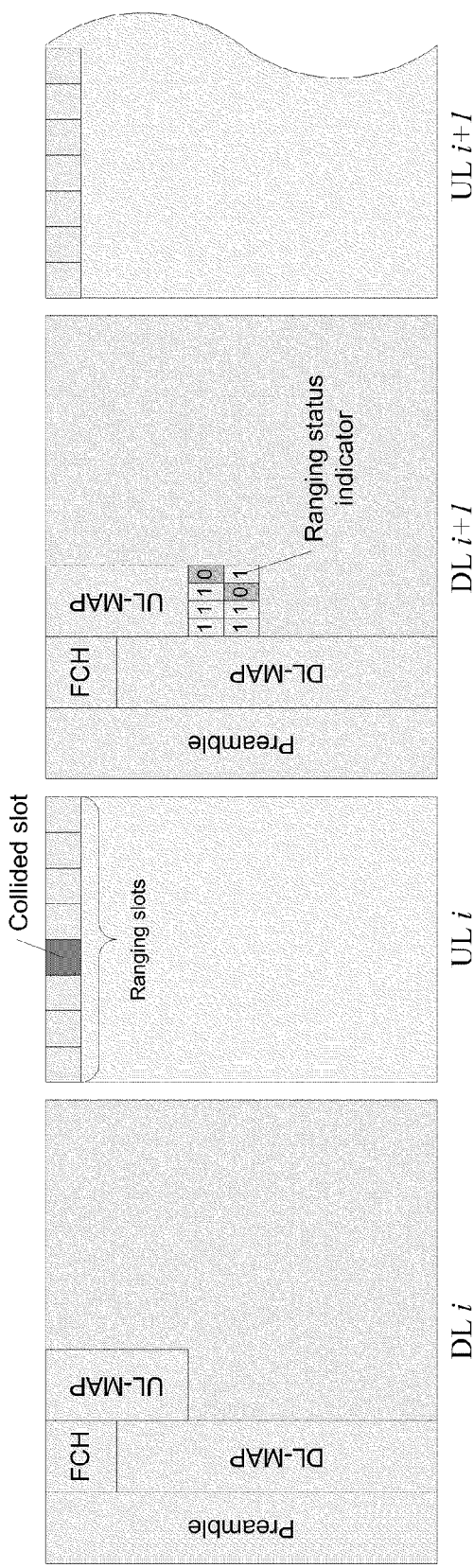
FIG. 5 illustrates a report comprising ranging status indicators.
Figure 6:
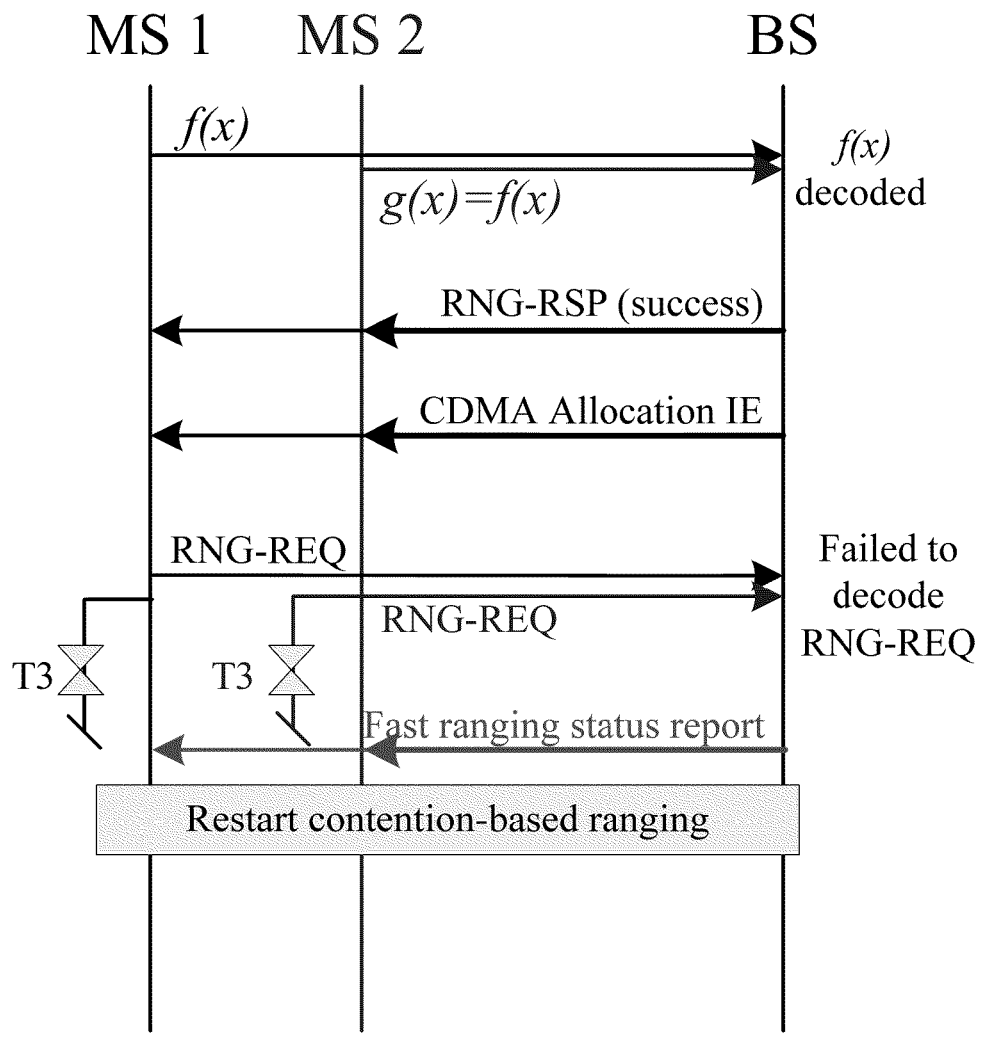
FIG. 6 illustrates a fast report of the RNG-REQ decoding status.
Figure 7:
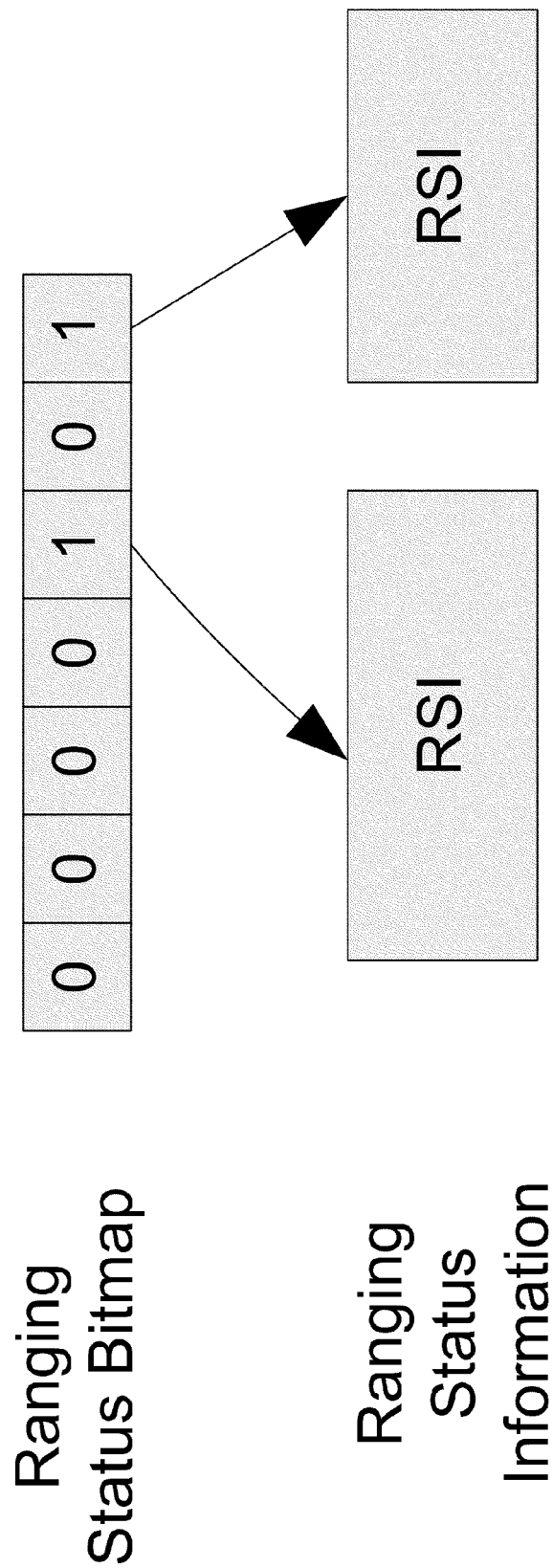
FIG. 7 illustrates a relationship between a preliminary decoding status report (a ranging status bitmap) and two detailed decoding status reports (ranging status information reports)

In the Ranging Status Bitmap (RSB)/Message for ranging code, "1" only indicates some codes/messages are decoded successfully, while "0" indicates none is decoded. If an MS detects the slot corresponding to itself is "1", it should decode another new defined message (RSI: Ranging Status Information) for detailed information to determine whether the code/message transmitted by itself is decoded or not. In the RSI, the decoded codes/Messages status should be listed corresponding to the bit with "1". FIG. 7 shows the relationship between the RSB/Msg and RSI.

In the RSI, all decoded CDMA codes/identifiers are listed. In addition, if the CDMA code is for bandwidth (BW) request and the BS can allocate the BW as well, the BW allocation can be carried in the RSI message at the same time. Because the ranging slot used by MS is known already (mapping between the RSB and ranging slot), in each RSI, bandwidth allocation can only be issued for specific CDMA ranging code without pointing out the allocation is for specific ranging slot (Frame number index, Ranging Symbol, Ranging subchannel), which reduces the overhead of CDMA allocation scheme adopted in 16d/e/j. If the CDMA is for initial ranging, the ranging response can also be contained in the RSI. Similarly, the ranging response can only be issued for specific CDMA ranging code. In the ranging response, the time/frequency/power adjustment elements should be carried as that in 16d/e/j system. Further, if the BS allocates the uplink BW for MS to send ranging request, the BW allocation can be included as well. In FIG. 8 some possible contents of RSI are listed.

The RSI can be broadcasted to all the MSs and its location should be known by MS, preferably following RSB/msg or in a fixed location in same DL subframe/frame with RSB/Msg or in a variable location where can be deduced by MS.

To reduce the overhead of RSB/Msg further:

Partition all the time slots into groups. Each group can correspond to a time slots subset which numbers have some common characteristics, for example, in the neighbour OFDMA symbols or in the neighbour sub channels. In this way, the MSs need to know the time slot occupied by itself belongs to which group. The rule for time slot grouping should be informed to MSs in the DL broadcast message. Then when a new MS performs initial ranging, after transmitting initial ranging code, it should check GRSB/Msg (Group Ranging Status Bitmap/Message) firstly. If the bit corresponding to itself is set with "0", the MS conducts back-off algorithm, otherwise it should check the RSB/Msg further to find its status.

This invention may propose a modified ranging procedure to reliably reduce the ranging latency. The Ranging Status Bitmap/message can be used to indicate whether there is/are code(s) being successful decoded or not. By introducing Ranging Status Information Message (RSI), MS can ascertain ranging status quickly and reliably. Ranging Response and Bandwidth Allocation can be contained in RSI as well, while with lower overhead compared with legacy system. Furthermore, Group Ranging Status Bitmap can be used to reduce the overhead of RSI.

The key benefits are as follows:

Reliably reduce the latency of ranging procedure.

Reduce overhead of Ranging Status Bitmap/Message.

Reduce overhead of CDMA Bandwidth allocation.

Reduce overhead of ranging response.

To reduce the ranging latency, the Ranging Status Bitmap/message can be used to indicate whether there is/are code(s) being successfully decoded or not in the corresponding ranging slot. However, in some special cases the mobile station can't get the ranging status. By introducing Ranging Status Information message (RSI), mobile station can get ranging status reliably. Furthermore, ranging response and bandwidth allocation can be contained in RSI as well, while with lower overhead compared with legacy system. To reduce the overhead RSI, Group Ranging Status Bitmap is introduced as well.

By reducing ranging latency, it will allow faster network register after MS power up, and also improve handover speed when handover ranging adopts the similar procedure with initial ranging.

It will be appreciated that the aforementioned circuitry may have other functions in addition to the mentioned functions, and that these functions may be performed by the same circuit.

In any of the above aspects, the various features may be implemented in hardware, or as software modules running on one or more processors. Features of one aspect may be applied to any of the other aspects.

The invention also provides a computer program or a computer program product for carrying out any of the methods described herein, and a computer readable medium having stored thereon a program for carrying out any of the methods described herein. A computer program embodying the invention may be stored on a computer-readable medium, or it could, for example, be in the form of a signal such as a downloadable data signal provided from an Internet website, or it could be in any other form.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method of operating a wireless communications system comprising at least one network station and a plurality of subscriber stations, the method comprising as part of a network access procedure, each of a number of the subscriber stations selecting a time slot from a plurality of predefined time slots and transmitting an individual code to the network station in the selected time slot;

at the network station receiving and decoding the codes;

broadcasting a preliminary decoding status report from the network station to the subscriber stations, the preliminary decoding status report comprising a plurality of preliminary decoding status indicators associated with respective time slots, each preliminary decoding status indicator comprising either a positive indicator indicating that one, some or all of the codes received in the respective time slot were decoded successfully, or a negative indicator indicating that none of the codes received in the respective time slot were decoded successfully, the network station associating each positive indicator with a respective detailed decoding status report; and broadcasting from the network station to the subscriber stations the respective detailed decoding status report associated with each time slot in which one or more codes were decoded successfully, each detailed decoding status report identifying each code that was decoded successfully amongst the codes received by the network station in the time slot with which the detailed decoding status report is associated; and at each subscriber station which transmitted a code to the network station, identifying successful decoding only if the preliminary decoding status indicator associated with the time slot in which subscriber station transmitted its code comprises a positive indicator, and if the detailed decoding status report associated with that positive indicator identifies the code transmitted by the subscriber station.

2. The method of claim 1 wherein the time slots are collected into a plurality of groups of time slots, the method further comprising broadcasting a group preliminary decoding status report from the network station to the subscriber stations, the group preliminary decoding status report comprising a plurality of group preliminary decoding status indicators associated with respective groups of time slots, each group preliminary decoding status indicator comprising either a positive group indicator indicating that one, some or all of the codes received in the respective group of time slots were decoded successfully, or a negative group indicator indicating that none of the codes received in the respective group of time slots were decoded successfully, the network station associating each positive group indicator with a respective preliminary decoding status report; and at each subscriber station which transmitted a code to the network station, identifying successful decoding only if, in the group preliminary decoding status report, the group preliminary decoding status indicator associated with the group of time slots in which the subscriber station transmitted its code comprises a positive group indicator, and if, in the preliminary decoding status report associated with the positive group indicator, the preliminary decoding status indicator associated with the time slot in which the subscriber station transmitted its code comprises a positive indicator, and if the detailed decoding status report associated with that positive indicator identifies the code transmitted by the subscriber station.

3. A method of operating a network station for use in a wireless communications system comprising at least the network station and a plurality of subscriber stations, the method comprising receiving and decoding codes transmitted respectively by each of a number of the subscriber stations as part of a network access procedure, each subscriber station having selected a time slot from a plurality of predefined time slots in which to transmit its code;

broadcasting a preliminary decoding status report to the subscriber stations, the preliminary decoding status report comprising a plurality of preliminary decoding status indicators associated with respective time slots, each preliminary decoding status indicator comprising either a positive indicator indicating that one, some or all of the codes received in the respective time slot were decoded successfully, or a negative indicator indicating that none of the codes received in the respective time slot were decoded successfully, the network station associating each positive indicator with a respective detailed decoding status report; and broadcasting to the subscriber stations the respective detailed decoding status report associated with each time slot in which one or more codes were decoded successfully, each detailed decoding status report identifying each code that was decoded successfully amongst the codes received by the network station in the time slot with which the detailed decoding status report is associated.

4. The method of claim 3 wherein the time slots are collected into a plurality of groups of time slots, the method further comprising broadcasting a group preliminary decoding status report from the network station to the subscriber stations, the group preliminary decoding status report comprising a plurality of group preliminary decoding status indicators associated with respective groups of time slots, each group preliminary decoding status indicator comprising either a positive group indicator indicating that one, some or all of the codes received in the respective group of time slots were decoded successfully, or a negative group indicator indicating that none of the codes received in the respective group of time slots were decoded successfully, the network station associating each positive group indicator with a respective preliminary decoding status report.

5. A method of operating a subscriber station for use in a wireless communications system comprising at least one network station and a plurality of the subscriber stations, the method comprising as part of a network access procedure, selecting a time slot from a plurality of predefined time slots and transmitting an individual code to the network station in the selected time slot;

receiving a preliminary decoding status report from the network station, the preliminary decoding status report comprising a plurality of preliminary decoding status indicators associated with respective time slots, each preliminary decoding status indicator comprising either a positive indicator indicating that one, some or all of the codes received in the respective time slot were decoded successfully, or a negative indicator indicating that none of the codes received in the respective time slot were decoded successfully, each positive indicator being associated with a respective detailed decoding status report;

receiving from the network station any detailed decoding status reports associated with respective time slots in which one or more codes were decoded successfully, each detailed decoding status report identifying each code that was decoded successfully amongst the codes received by the network station in the time slot with which the detailed decoding status report is associated; and identifying successful decoding only if the preliminary decoding status indicator associated with the time slot in which subscriber station transmitted its code comprises a positive indicator, and if the detailed decoding status report associated with that positive indicator identifies the code transmitted by the subscriber station.

6. The method of claim 5 wherein the time slots are collected into a plurality of groups of time slots, the method further comprising receiving a group preliminary decoding status report from the network station, the group preliminary decoding status report comprising a plurality of group preliminary decoding status indicators associated with respective groups of time slots, each group preliminary decoding status indicator comprising either a positive group indicator indicating that one, some or all of the codes received in the respective group of time slots were decoded successfully, or a negative group indicator indicating that none of the codes received in the respective group of time slots were decoded successfully, each positive group indicator being associated with a respective preliminary decoding status report; and identifying successful decoding only if, in the group preliminary decoding status report, the group preliminary decoding status indicator associated with the group of time slots in which the subscriber station transmitted its code comprises a positive group indicator, and if, in the preliminary decoding status report associated with the positive group indicator, the preliminary decoding status indicator associated with the time slot in which the subscriber station transmitted its code comprises a positive indicator, and if the detailed decoding status report associated with that positive indicator identifies the code transmitted by the subscriber station.

7. Apparatus for a network station for use in a wireless communications system comprising at least the network station and a plurality of subscriber stations, the apparatus comprising preliminary decoding status circuitry configured to prepare a preliminary decoding status report comprising a plurality of preliminary decoding status indicators associated with respective time slots, each preliminary decoding status indicator comprising either a positive indicator indicating that one, some or all of the codes received in the respective time slot were decoded successfully, or a negative indicator indicating that none of the codes received in the respective time slot were decoded successfully, the preliminary decoding status circuitry being configured to associate each positive indicator with a respective detailed decoding status report; and detailed decoding status circuitry configured to obtain data identifying one or more codes which have decoded successfully by decoding circuitry of the network station, the codes having been transmitted to the network station respectively by each of a number of the subscriber stations as part of a network access procedure, each subscriber station having selected a time slot from a plurality of predefined time slots in which to transmit its code; wherein the detailed decoding status circuitry is configured to prepare a respective detailed decoding status report associated with each time slot in which one or more codes were decoded successfully, each detailed decoding status report identifying each code that was decoded successfully amongst the codes received by the network station in the time slot with which the detailed decoding status report is associated, the detailed decoding status reports being for broadcast to the subscriber stations.

8. The apparatus of claim 7 wherein the time slots are collected into a plurality of groups of time slots, and wherein the decoding status circuitry comprises group preliminary decoding status circuitry configured to prepare a group preliminary decoding status report comprising a plurality of group preliminary decoding status indicators associated with respective groups of time slots, each group preliminary decoding status indicator comprising either a positive group indicator indicating that one, some or all of the codes received in the respective group of time slots were decoded successfully, or a negative group indicator indicating that none of the codes received in the respective group of time slots were decoded successfully, the group preliminary decoding status circuitry being configured to associate each positive group indicator with a respective preliminary decoding status report.

9. Apparatus for a subscriber station for use in a wireless communications system comprising at least one network station and a plurality of the subscriber stations, the apparatus comprising network access circuitry configured to obtain information identifying a time slot selected from a plurality of predefined time slots and an individual code transmitted from the subscriber station to the network station in the selected time slot as part of a network access procedure;

the network access circuitry being configured to receive a preliminary decoding status report from the network station, the preliminary decoding status report comprising a plurality of preliminary decoding status indicators associated with respective time slots, each preliminary decoding status indicator comprising either a positive indicator indicating that one, some or all of the codes received in the respective time slot were decoded successfully, or a negative indicator indicating that none of the codes received in the respective time slot were decoded successfully, each positive indicator being associated with a respective detailed decoding status report; and wherein the network access circuitry is configured to receive from the network station any detailed decoding status reports associated with respective time slots in which one or more codes were decoded successfully, each detailed decoding status report identifying each code that was decoded successfully amongst the codes received by the network station in the time slot with which the detailed decoding status report is associated; and the network access circuitry being configured to identify successful decoding only if the preliminary decoding status indicator associated with the time slot in which subscriber station transmitted its code comprises a positive indicator, and if the detailed decoding status report associated with that positive indicator identifies the code transmitted by the subscriber station.

10. The apparatus of claim 9 wherein the time slots are collected into a plurality of groups of time slots, and wherein the network access circuitry is configured to receive a group preliminary decoding status report from the network station, the group preliminary decoding status report comprising a plurality of group preliminary decoding status indicators associated with respective groups of time slots, each group preliminary decoding status indicator comprising either a positive group indicator indicating that one, some or all of the codes received in the respective group of time slots were decoded successfully, or a negative group indicator indicating that none of the codes received in the respective group of time slots were decoded successfully, each positive group indicator being associated with a respective preliminary decoding status report; and to identify successful decoding only if, in the group preliminary decoding status report, the group preliminary decoding status indicator associated with the group of time slots in which the subscriber station transmitted its code comprises a positive group indicator, and if, in the preliminary decoding status report associated with the positive group indicator, the preliminary decoding status indicator associated with the time slot in which the subscriber station transmitted its code comprises a positive indicator, and if the detailed decoding status report associated with that positive indicator identifies the code transmitted by the subscriber station.

11. A non-transitory computer readable medium comprising a computer program which, when run on a computer, causes the computer to perform the method as claimed in claim 3.

12. A non-transitory computer readable medium comprising a computer program which, when run on a computer, causes the computer to perform the method as claimed in claim 5.

* * * * *